US011507313B2

(12) United States Patent
Farrahi Moghaddam et al.

(10) Patent No.: US 11,507,313 B2
(45) Date of Patent: Nov. 22, 2022

(54) DATAFALL: A POLICY-DRIVEN ALGORITHM FOR DECENTRALIZED PLACEMENT AND REORGANIZATION OF REPLICATED DATA

(71) Applicant: Telefonaktiebolaget LM Ericsson (publ), Stockholm (SE)

(72) Inventors: Fereydoun Farrahi Moghaddam, Brossard (CA); Reza Farrahi Moghaddam, Brossard (CA); Wubin Li, Kirkland (CA); Abdelouahed Gherbi, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 173 days.

(21) Appl. No.: 16/955,230

(22) PCT Filed: Dec. 20, 2017

(86) PCT No.: PCT/IB2017/058206
§ 371 (c)(1),
(2) Date: Jun. 18, 2020

(87) PCT Pub. No.: WO2019/122971
PCT Pub. Date: Jun. 27, 2019

(65) Prior Publication Data

US 2020/0333985 A1 Oct. 22, 2020

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01); *G06F 3/0638* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 9,021,296 B1 4/2015 Kiselev et al.
9,158,472 B2 * 10/2015 Kesselman ......... G06F 16/2291
(Continued)

OTHER PUBLICATIONS

S. A. Weil, S. A. Brandt, E. L. Miller and C. Maltzahn, "CRUSH: Controlled, Scalable, Decentralized Placement of Replicated Data," SC '06: Proceedings of the 2006 ACM/IEEE Conference on Supercomputing, 2006, pp. 31-31, doi: 10.1109/SC.2006.19. (Year: 2006).*
(Continued)

*Primary Examiner* — Daniel C. Chappell
(74) *Attorney, Agent, or Firm* — Sage Patent Group

(57) ABSTRACT

Systems and methods for generating and using a placement map for a distributed storage system are disclosed. In some embodiments, a method for a client node to perform a read/write operation in a distributed storage system comprises obtaining a number of server nodes comprised in the distributed storage system and an object name of an object for which a read/write operation is to be performed and creating at least a portion of a three-dimensional (3D) placement map for the object. The 3D placement map defines candidate locations for replicas of the object on the server nodes. The method further comprises applying policies to the at least a portion of the 3D placement map to provide at least a portion of a modified 3D placement map and performing the read/write operation for the object in accordance with the at least a portion of the modified 3D placement map.

18 Claims, 16 Drawing Sheets

(58) Field of Classification Search

CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS 9,292,559 B2 * 3/2016 Arauz-Rosado ...... G06F 16/278
9,396,202 B1 * 7/2016 Drobychev ........... G06F 16/178
9,507,528 B2 * 11/2016 Rundle ............... G06F 12/0866
10,031,935 B1 * 7/2018 Cole ................... G06F 16/2372
10,037,386 B1 * 7/2018 Esam .................. H04L 67/1095
10,592,153 B1 * 3/2020 Subramaniam ......... G06F 3/061
11,256,628 B2 * 2/2022 Meiri .................... G06F 3/0638
2003/0140051 A1 * 7/2003 Fujiwara ............. H04L 67/1097
2004/0139103 A1 * 7/2004 Boyce .................... G06V 20/69 707/999.102
2007/0067252 A1 * 3/2007 Hengerer ............... G16H 30/20
2008/0031548 A1 * 2/2008 Brinson .................. G06T 5/008 382/305
2008/0101194 A1 * 5/2008 Ohashi ................... G11B 27/24 369/84
2009/0164247 A1 * 6/2009 Dobler ................... G06Q 10/10 705/3
2009/0271412 A1 10/2009 Lacapra et al.
2011/0072206 A1 * 3/2011 Ross ..................... G06F 3/0604 711/108
2011/0196835 A1 * 8/2011 Kesselman ............. G06F 16/27 707/634
2014/0379715 A1 * 12/2014 Kesselman ........... G06F 3/0656 707/737
2015/0186043 A1 * 7/2015 Kesselman ............. G06F 3/067 711/162
2016/0330281 A1 11/2016 Narayanan et al.
2016/0335166 A1 11/2016 George et al.
2017/0251073 A1 8/2017 Raghunath et al.
2021/0216214 A1 * 7/2021 Tornow ................. G06F 3/0647
2021/0271648 A1 * 9/2021 Arbel ...................... G06F 3/061

OTHER PUBLICATIONS

P. Carns, K. Harms, J. Jenkins, M. Mubarak, R. Ross and C. Carothers, "Impact of data placement on resilience in large-scale object storage systems," 2016 32nd Symposium on Mass Storage Systems and Technologies (MSST), 2016, pp. 1-12, doi: 10.1109/MSST.2016.7897091. (Year: 2016).*

F. F. Moghaddam, W. Li and A. Gherbi, "DataFall: A Policy-Driven Algorithm for Decentralized Placement and Reorganization of Replicated Data," ISPA/IUCC/BDCloud/SocialCom/SustainCom, 2018, pp. 667-675, doi: 10.1109/BDCloud.2018.00102 (Year: 2018).*

H. Sofia, E. Anas and O. Faïz, "Mobile Mapping, Machine Learning and Digital Twin for Road Infrastructure Monitoring and Maintenance: Case Study of Mohammed VI Bridge in Morocco," 2020 IEEE International conference of Moroccan Geomatics (Morgeo), 2020, pp. 1-6, doi: 10.1109/Morgeo49228.2020.9121882. (Year: 2020).*

H. M. Ammari, "Connected Coverage in Three-Dimensional Wireless Sensor Networks Using Convex Polyhedral Space-Fillers," 2017 13th International Conference on Distributed Computing in Sensor Systems (DCOSS), 2017, pp. 183-190, doi: 10.1109/DCOSS.2017.12. (Year: 2017).*

Weil, Sage A., et al., "Ceph: A Scalable, High-Performance Distributed File System," Proceedings of the 7th Conference on Operating Systems Design and Implementation (OSDI '06), Nov. 2006, 14 pages.

Weil, Sage A., et al., "CRUSH: Controlled, Scalable, Decentralized Placement of Replicated Data," Proceedings of the 2006 ACM/IEEE Conference on Supercomputing, Nov. 2006, 12 pages.

International Search Report and Written Opinion for International Patent Application No. PCT/IB2017/058206, dated Sep. 6, 2018, 16 pages.

* cited by examiner

DATAFALL: A POLICY-DRIVEN ALGORITHM FOR DECENTRALIZED PLACEMENT AND REORGANIZATION OF REPLICATED DATA

This application is a 35 U.S.C. § 371 national phase filing of International Application No. PCT/IB2017/058206, filed Dec. 20, 2017, the disclosure of which is incorporated herein by reference in its entirety.

TECHNICAL FIELD

The present disclosure relates to a distributed cloud storage system, or Software Defined Storage (SDS) system; and, in particular, to systems and methods for determining the locations of objects in a distributed cloud storage system without the use of a central load balancer.

BACKGROUND

Software Defined Storage (SDS) separates the physical storage hardware from the data storage management. SDS enables implementation of a data storage network with off-the-shelf hardware, thereby enabling low-cost data storage solutions. One example of SDS is the Ceph SDS solution. Ceph using a unique load balancing algorithm is referred to as CRUSH. CRUSH eliminates the need for a central load balancer, which is the key to scalability of the Ceph SDS solution. Details regarding Ceph and CRUSH can be found in Weil, Sage A., et al. "Ceph: A Scalable, High-Performance Distributed File System," Proceedings of the 7th symposium on Operating systems design and implementation, USENIX Association, Nov. 6-8, 2006 and Weil, Sage A., et al. "CRUSH: Controlled, Scalable, Decentralized Placement of Replicated Data," Proceedings of the 2006 ACM/IEEE Conference on Supercomputing, ACM, Nov. 11-17, 2006.

The use of a load balancing technique, such as CRUSH, that does not use a central load balancer results in several issues that need to be addressed. First, a non-centralized load balancing technique needs to be able to deal with adding and removing physical server nodes in the underlying hardware layer as well as temporarily unavailable physical server nodes in the underlying hardware layer. To deal with these issues, CRUSH uses the concepts of placement groups. However, when using CRUSH, a storage administrator should always have a good guess for configuring the placement group numbers. Otherwise, the administrator needs to reconfigure the cluster (i.e., the SDS system including the storage devices and software), which leads to mass migration of data. Furthermore, when the objects are placed in the same pool, they can only have the number of replicas that are set for that pool, i.e., the replica factor is on the pool level.

Therefore, there is a need for an improved non-centralized load balancing technique for a SDS solution.

SUMMARY

Systems and methods for generating and using a placement map for a distributed storage system are disclosed. In some embodiments, a method for a client node to perform a read/write operation in a distributed storage system comprises obtaining a number of server nodes in a plurality of server nodes comprised in the distributed storage system and an object name of an object for which a read/write operation is to be performed and creating at least a portion of a three-dimensional (3D) placement map for the object as a function of the number of server nodes and the object name, wherein the 3D placement map defines a plurality of candidate locations for a plurality of replicas of the object on the plurality of server nodes comprised in the distributed storage system. The method further comprises applying one or more policies to the at least a portion of the 3D placement map to provide at least a portion of a modified 3D placement map for the object and performing the read/write operation for the object in accordance with the at least a portion of the modified 3D placement map for the object.

In some embodiments, performing the read/write operation for the object in accordance with the at least a portion of the modified 3D placement map for the object comprises performing the read/write operation for the object from/to one of the plurality of server nodes defined by the at least a portion of the modified 3D placement map as a first candidate location for one of the plurality of replicas of the object when the plurality of server nodes consists of the obtained number of server nodes.

In some embodiments, the at least a portion of the 3D placement map for the object is a portion of the 3D placement map that defines the plurality of candidate locations for the plurality of replicas of the object for only one of the plurality of possible values for the number of server nodes that is equal to the obtained number of server nodes.

In some embodiments, the at least a portion of the 3D placement map for the object is a portion of the 3D placement map that defines the plurality of candidate locations for only one of the plurality of replicas of the object for only one of the plurality of possible values for the number of server nodes that is equal to the obtained number of server nodes.

In some embodiments, the at least a portion of the 3D placement map for the object is the 3D placement map that defines the plurality of candidate locations for all of the plurality of replicas of the object for all of the plurality of possible values for the number of server nodes.

In some embodiments, creating the at least a portion of the 3D placement map comprises generating a set of reproducible random values as a function of the object name, where the set of reproducible random values comprises, for each of at least one possible value for the number of server nodes in the distributed storage system, a plurality of reproducible random values for each of the plurality of replicas of the object, respectively. The at least one possible value for the number of server nodes comprises the obtained number of server nodes and no two random values in the set of reproducible random values are the same. Creating the at least a portion of the 3D placement map further comprises converting the set of reproducible random values into the at least a portion of the 3D placement map for the object.

In some embodiments, converting the set of reproducible random values into the at least a portion of the 3D placement map for the object comprises, for a random value ($h_{i,j,k}$) from the set of reproducible random values that corresponds to a k-th candidate location for an i-th replica of the object for a j-th possible value for the number of server nodes, determining whether mod($h_{i,j,k}$, j) is equal to zero. Upon determining that mod($h_{i,j,k}$, j) is equal to zero, a value ($C_{i,j,k}$) in the 3D placement map for the object for the k-th candidate location for the i-th replica of the object for the j-th possible value for the number of server nodes is set equal to a value that indexes a j-th server node from among the plurality of server nodes in the distributed storage system. Upon determining that mod($h_{i,j,k}$, j) is not equal to zero, the value ($C_{i,j,k}$) in the 3D placement map for the object for the k-th candidate location for the i-th replica of the object for the j-th possible value for the number of server nodes is set equal to a value ($C_{i,j-1,k}$) in the 3D placement map for the object for the k-th candidate location for the i-th replica of the object for a (j−1)-th possible value for the number of server nodes.

In some embodiments, converting the set of reproducible random values into the at least a portion of the 3D placement map for the object comprises, for each random value ($h_{i,j,k}$) from a plurality of random values ($h_{i,j,k}$ for k=1, . . . , D) for an i-th replica of the object for a j-th possible value for the number of server nodes, determining whether mod($h_{i,j,k}$, j) is equal to zero. Upon determining that mod($h_{i,j,k}$, j) is equal to zero, a value ($C_{i,j,k}$) in the 3D placement map for the object for the k-th candidate location for the i-th replica of the object for the j-th possible value for the number of server nodes is set equal to a value that indexes a j-th server node from among the plurality of server nodes in the distributed storage system. Upon determining that mod($h_{i,j,k}$, j) is not equal to zero, the value ($C_{i,j,k}$) in the 3D placement map for the object for the k-th candidate location for the i-th replica of the object for the j-th possible value for the number of server nodes is set equal to a value ($C_{i,j-1,k}$) in the 3D placement map for the object for the k-th candidate for the i-th replica of the object for a (j−1)-th possible value for the number of server nodes. Further, applying the one or more policies comprises removing one or more of the plurality of candidate locations in the at least a portion of the 3D placement map for the i-th replica of the object for the j-th possible value for the number of server nodes in accordance with the one or more policies and shifting a plurality of remaining candidate locations in the 3D placement map for the i-th replica of the object for the j-th possible value for the number of server nodes to replace the removed candidate locations. Further, in some embodiments, the value ($C_{i,j,1}$) in the modified 3D placement map for a first candidate location of the plurality of remaining candidate locations for the i-th replica of the object for the j-th possible value for the number of server nodes indicates one of the plurality of server nodes on which the i-th replica of the object is located if the number of server nodes is equal to the j-th possible value for the number of server nodes.

In some embodiments, the one or more policies comprise a policy to remove one or more failed server nodes in a list of failed server nodes obtained by the client node.

In some embodiments, the one or more policies comprise a policy to not repeat a server node in the plurality of replicas of the object for the j-th possible value for the number of server nodes until all of the plurality of server nodes have been used once.

In some embodiments, the one or more policies comprise a policy to weight the plurality of server nodes in accordance with one or more capabilities of the plurality of server nodes such that the plurality of server nodes are included in the 3D placement map in accordance with their respective weightings.

In some embodiments, the one or more policies comprise a topology-based policy.

Embodiments of a client node for performing a read/write operation in a distributed storage system are also disclosed. In some embodiments, a client node for performing a read/write operation in a distributed storage system is adapted to obtain a number of server nodes in a plurality of server nodes comprised in the distributed storage system and an object name of an object for which a read/write operation is to be performed and create at least a portion of a 3D placement map for the object as a function of the number of server nodes and the object name, where the 3D placement map defines a plurality of candidate locations for a plurality of replicas of the object on the plurality of server nodes comprised in the distributed storage system. The client node is further adapted to apply one or more policies to the at least a portion of the 3D placement map to provide at least a portion of a modified 3D placement map for the object and perform the read/write operation for the object in accordance with the at least a portion of the modified 3D placement map for the object.

In some embodiments, a client node for performing a read/write operation in a distributed storage system comprises a network interface, at least one processor, and memory comprising instructions executable by the at least one processor whereby the client node is operable to obtain a number of server nodes in a plurality of server nodes comprised in the distributed storage system and an object name of an object for which a read/write operation is to be performed; create at least a portion of a 3D placement map for the object as a function of the number of server nodes and the object name, wherein the 3D placement map defines a plurality of candidate locations for a plurality of replicas of the object on the plurality of server nodes comprised in the distributed storage system; apply one or more policies to the at least a portion of the 3D placement map to provide at least a portion of a modified 3D placement map for the object; and perform the read/write operation for the object in accordance with the at least a portion of the modified 3D placement map for the object.

Embodiments of a method for a server node in a distributed storage system are also disclosed. In some embodiments, a method for a server node in a distributed storage system comprise obtaining a number of server nodes in a plurality of server nodes comprised in the distributed storage system and an object name of an object and creating at least a portion of a 3D placement map for the object as a function of the number of server nodes and the object name, where the 3D placement map defines a plurality of candidate locations for a plurality of replicas of the object on the plurality of server nodes comprised in the distributed storage system. The method further comprises applying one or more policies to the at least a portion of the 3D placement map to provide at least a portion of a modified 3D placement map for the object and performing one or more actions based on the at least a portion of the modified 3D placement map for the object.

In some embodiments, performing the one or more actions comprise storing one or more of the plurality of replicas of the object at the locations defined by the at least a portion of the modified 3D placement map.

In some embodiments, the at least a portion of the 3D placement map for the object is a portion of the 3D placement map that defines the plurality of candidate locations for the plurality of replicas of the object for only one of the plurality of possible values for the number of server nodes that is equal to the obtained number of server nodes.

In some embodiments, the at least a portion of the 3D placement map for the object is a portion of the 3D placement map that defines the plurality of candidate locations for only one of the plurality of replicas of the object for only one of the plurality of possible values for the number of server nodes that is equal to the obtained number of server nodes.

In some embodiments, the at least a portion of the 3D placement map for the object is the 3D placement map that defines the plurality of candidate locations for all of the plurality of replicas of the object for all of the plurality of possible values for the number of server nodes.

In some embodiments, creating the at least a portion of the 3D placement map comprises generating a set of reproducible random values as a function of the object name, the set of reproducible random values comprising, for each of at least one of the plurality of possible values for the number of server nodes in the distributed storage system, a plurality of reproducible random values for each of the plurality of replicas of the object, respectively, where the at least one of the plurality of possible values for the number of server nodes comprises the obtained number of server nodes and no two random values in the set of reproducible random values are the same. Creating the at least a portion of the 3D placement map further comprises converting the set of reproducible random values into the at least a portion of the 3D placement map for the object.

In some embodiments, converting the set of reproducible random values into the at least a portion of the 3D placement map for the object comprises, for a random value ($h_{i,j,k}$) from the set of reproducible random values that corresponds to a k-th candidate location for an i-th replica of the object for a j-th possible value for the number of server nodes, determining whether mod($h_{i,j,k}$, j) is equal to zero. Upon determining that mod($h_{i,j,k}$, j) is equal to zero, a value ($C_{i,j,k}$) in the 3D placement map for the object for the k-th candidate location for the i-th replica of the object for the j-th possible value for the number of server nodes is set equal to a value that indexes a j-th server node from among the plurality of server nodes in the distributed storage system. Upon determining that mod($h_{i,j,k}$, j) is not equal to zero, the value ($C_{i,j-1,k}$) in the 3D placement map for the object for the k-th candidate location for the i-th replica of the object for the j-th possible value for the number of server nodes is set equal to a value ($C_{i,j-1,k}$) in the 3D placement map for the object for the k-th candidate location for the i-th replica of the object for a (j−1)-th possible value for the number of server nodes.

In some embodiments, converting the set of reproducible random values into the at least a portion of the 3D placement map for the object comprises, for each random value ($h_{i,j,k}$) from a plurality of random values ($h_{i,j,k}$ for k=1, . . . , D) for an i-th replica of the object for a j-th possible value for the number of server nodes, determining whether mod($h_{i,j,k}$, j) is equal to zero. Upon determining that mod($h_{i,j,k}$, j) is equal to zero, a value ($C_{i,j,k}$) in the 3D placement map for the object for the k-th candidate location for the i-th replica of the object for the j-th possible value for the number of server nodes is set equal to a value that indexes a j-th server node from among the plurality of server nodes in the distributed storage system. Upon determining that mod($h_{i,j,k}$, j) is not equal to zero, the value ($C_{i,j,k}$) in the 3D placement map for the object for the k-th candidate location for the i-th replica of the object for the j-th possible value for the number of server nodes is set equal to a value ($C_{i,j-1,k}$) in the 3D placement map for the object for the k-th candidate location for the i-th replica of the object for a (j−1)-th possible value for the number of server nodes. Further, applying the one or more policies comprises removing one or more of the plurality of candidate locations in the 3D placement map for the i-th replica of the object for the j-th possible value for the number of server nodes in accordance with the one or more policies and shifting a plurality of remaining candidate locations in the 3D placement map for the i-th replica of the object for the j-th possible value for the number of server nodes to replace the candidate locations. Further, in some embodiments, the value ($C_{i,j,1}$) in the modified 3D placement map for a first candidate location of the plurality of candidate locations for the i-th replica of the object for the j-th possible value for the number of server nodes indicates one of the plurality of server nodes on which the i-th replica of the object is located if the number of server nodes is equal to the j-th possible value for the number of server nodes.

In some embodiments, the one or more policies comprise a policy to remove one or more failed server nodes in a list of failed server nodes obtained by the client node.

In some embodiments, the one or more policies comprise a policy to not repeat a server node in the plurality of replicas of the object for the j-th possible value for the number of server nodes until all of the plurality of server nodes have been used once.

In some embodiments, the one or more policies comprise a policy to weight the plurality of server nodes in accordance with one or more capabilities of the plurality of server nodes such that plurality of server nodes are included in the 3D placement map in accordance with their respective weightings.

In some embodiments, the one or more policies comprise a topology-based policy.

Embodiments of a server node for a distributed storage system are also disclosed. In some embodiments, a server node for a distributed storage system is adapted to obtain a number of server nodes in a plurality of server nodes comprised in the distributed storage system and an object name of an object and create at least a portion of a 3D placement map for the object as a function of the number of server nodes and the object name, wherein the 3D placement map defines a plurality of candidate locations for a plurality of replicas of the object on the plurality of server nodes comprised in the distributed storage system. The server node is further adapted to apply one or more policies to the at least a portion of the 3D placement map to provide at least a portion of a modified 3D placement map for the object and perform one or more actions based on the at least a portion of the modified 3D placement map for the object.

In some embodiments, a server node for a distributed storage system comprises a network interface, at least one processor, memory comprising instructions executable by the at least one processor whereby the client node is operable to: obtain a number of server nodes in a plurality of server nodes comprised in the distributed storage system and an object name of an object; create at least a portion of a 3D placement map for the object as a function of the number of server nodes and the object name, wherein the 3D placement map defines a plurality of candidate locations for a plurality of replicas of the object on the plurality of server nodes comprised in the distributed storage system; apply one or more policies to the at least a portion of the 3D placement map to provide at least a portion of a modified 3D placement map for the object; and perform one or more actions based on the at least a portion of the modified 3D placement map for the object.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
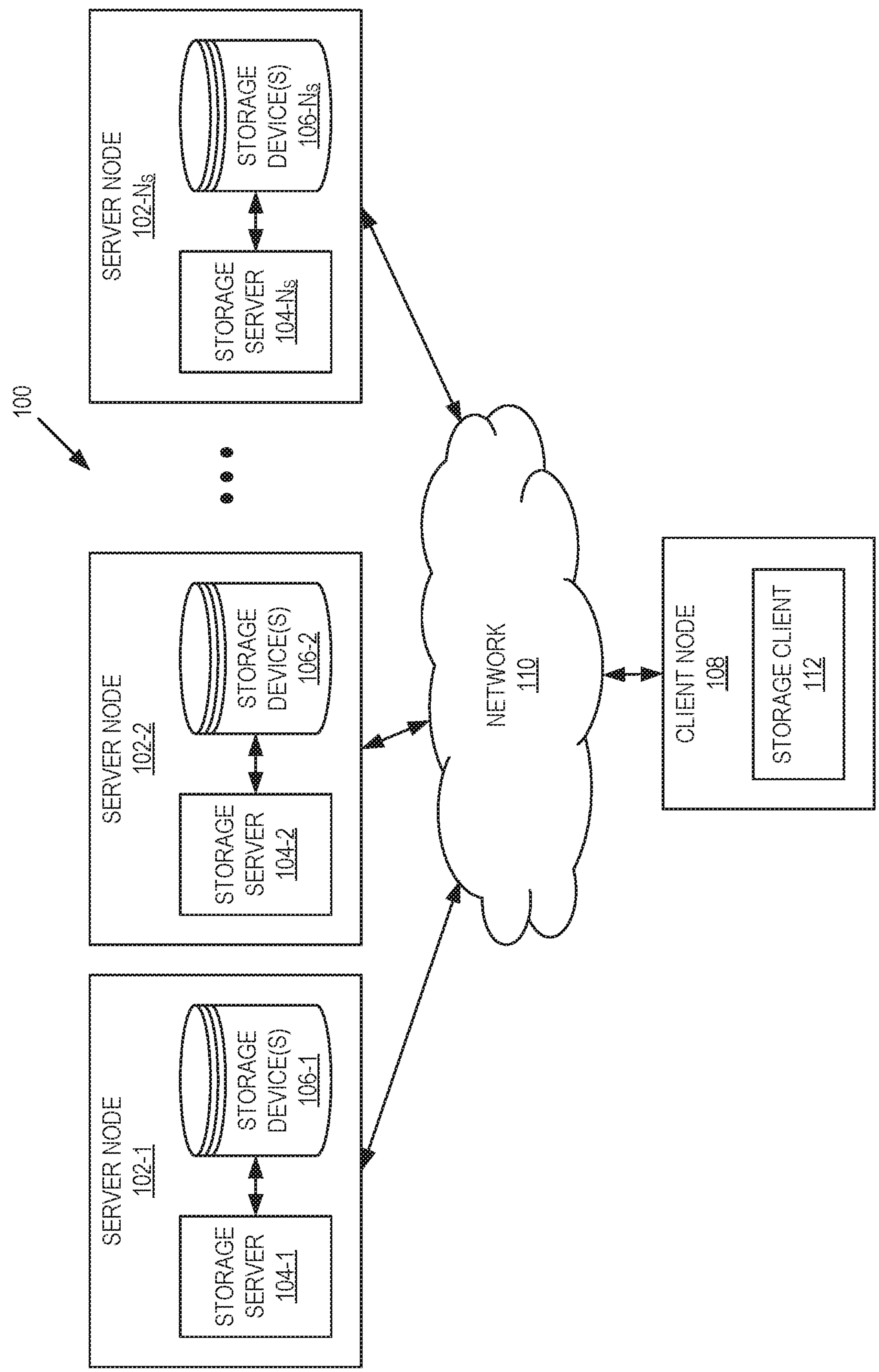
FIG. 1 illustrates one example of a distributed storage system in accordance with some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

For a distributed storage system (e.g., a distributed cloud storage system or distributed Software Defined Storage (SDS)) to scale, there is a need to eliminate the role of a central load-balancer (i.e., the bottleneck). This means that the client node must reach the server nodes directly for read/write operations. However, one challenge is how the client nodes are to know which server node stores its data without the use of a central entity in the system. A data mapping algorithm such as CRUSH in Ceph can be used in this regard to help client nodes identify which server node they need to connect to for read/write operations. The data mapping algorithm also helps the cluster (i.e., the server nodes of the distributed storage system including the storage devices and software) to move the data in case some changes happen in the cluster such as addition, removal, or failure of a server node. But this algorithm cannot be arbitrary. It should work in a way that provides a global/policy-based load-balance in the system. That is why creating such algorithms is not easy. For instance, if a server node is added to the cluster, some of the client nodes which were connecting to some particular server nodes for read/write operations need to connect to the newly added server node. In an ideal system, only a portion of the client nodes must be affected and there must be no additional data move between already existing server nodes. In another example, if an arbitrary server node fails, the client nodes having their data stored on that particular server node must be able to identify another server node in the cluster for read/write operations just by using the algorithm. At the same time, this move of data to the new server nodes should be minimum and completely balanced and there should not be any entity in the cluster that is keeping track of the moved data. All the tracking should be calculable by the client nodes and the server nodes by using only the algorithm and minimum data of how many server nodes there are in the cluster and which server nodes are available.

Systems and methods relating to a non-centralized data mapping scheme for a distributed storage system (e.g., a SDS system) are disclosed. The non-centralized data mapping scheme includes a built-in load-balancing aspect that mitigates the need to move data in the distributed storage system when server nodes are added, removed, and/or temporarily unavailable. The non-centralized data mapping scheme provides a data map, which is also referred to herein as a placement map, for the distributed storage system to both the server nodes and client nodes using deterministic calculations without the need for a database to maintain the data map. At the same time, it is able to provide the complete load-balance of data through its built-in load-balancing feature and also be customized towards different applications with its built-in policy-driven load-balancing.

In some embodiments, the data mapping scheme has a built-in load-balancing feature which liberates the storage administrator of the distributed storage system from configuring and re-configuring the distributed storage system, which in turn avoids mass migration of data. In some embodiments, the data mapping scheme also benefits from a built-in policy driven load-balancing mechanism.

While embodiments of the present disclosure are not limited to or by any particular advantages, some advantages provided by embodiments of the present disclosure include:

- Low overhead;
- Four important features:
  - The location of objects/replicas is predefined (deterministically calculable) so there is no need for storing the data map. The predefined locations of the objects/replicas enable client nodes to directly connect to the appropriate server node for a maximum performance.
  - The objects/replicas are uniformly distributed across the server nodes.
  - Each object can have its own features (e.g., number of replicas) and yet its primary replica and secondary replicas will be uniformly distributed among other objects with different features. If an object feature changes, it will not affect the uniformity of the distribution of the objects, although everything is predefined (e.g., locations of the objects/replicas are deterministic).

In case of failure, addition, or removal of a server node:
 - Data movement, or migration, is minimized.
 - The locations of the objects/replicas remain predefined (i.e., deterministic) and are uniformly distributed in regard to the other objects.

Built-in data load-balancing.

Built-in policy driven load-balancing, which helps with implementation of Intelligent Distributed Cloud Storage System (DCSS).

Ability to set the number of replicas per object.

In this regard, FIG. 1 illustrates one example of a distributed storage system 100 in accordance with some embodiments of the present disclosure. The distributed storage system 100 is preferably a cloud-based storage system such as a cloud-based SDS system. As illustrated, the distributed storage system 100 includes a number ($N_S$) of server nodes 102-1 through 102-$N_S$, which are generally referred to herein as server nodes 102. Note that the server nodes 102-1 through 102-$N_S$ are also referred to herein as a "cluster" or "cluster of server nodes." The server nodes 102 are physical nodes comprising hardware (e.g., processor(s), memory, etc.) and software. In this particular example, the server nodes 102-1 through 102-$N_S$ include storage servers 104-1 through 104-$N_S$ and storage devices 106-1 through 106-$N_S$, which are generally referred to herein as storage servers 104 and storage devices 106. The storage servers 104 are preferably implemented in software and operate to provide the functionality of the server nodes 102 described herein. The storage devices 106 are physical storage devices such as, e.g., hard drives.

The distributed storage system 100 also includes a client node 108 that communicates with the server nodes 102 via a network 110 (e.g., the Internet). While only one client node 108 is illustrated for clarity and ease of discussion, the distributed storage system 100 typically includes many client nodes 108. The client node 108 is a physical node (e.g., a personal computer, a laptop computer, a smart phone, a tablet, or the like). The client node 108 includes a storage client 112, which is preferably implemented in software. The storage client 112 operates to provide the functionality of the client node 108 described herein.

The server nodes 102 operate to store a number of replicas of each of a number of objects. For each object, one of the replicas serves as a primary replica/copy of the object and the other replicas serve as secondary replicas/copies of the object. As discussed below, for a particular object, a number of replicas of the object are stored on the server nodes 102 in accordance with a data map for that object. The data map for the object is also referred to herein as a placement map for the object. The placement map for the object is deterministic and is able to be generated based on an object name of the object, the number ($N_S$) of server nodes 102 in the distributed storage system 100, and, in some embodiments, one or more defined policies (i.e., remove any failed server nodes from the placement map and replace in a deterministic manner). The placement map for the object, or a desired portion thereof, is generated by the client node 108 and used by the client node 108 to perform read and/or write operations for the object. In addition, as discussed below, the placement map for the object is generated by each of the server nodes 102 and used to perform an action(s) such as, for example, storing the replicas of the object on the server nodes 102 once the primary replica of the object is stored, moving the replicas of the object on the server nodes 102 in response to, e.g., addition, removal, or failure of a server node 102, or the like.

Figure 2:
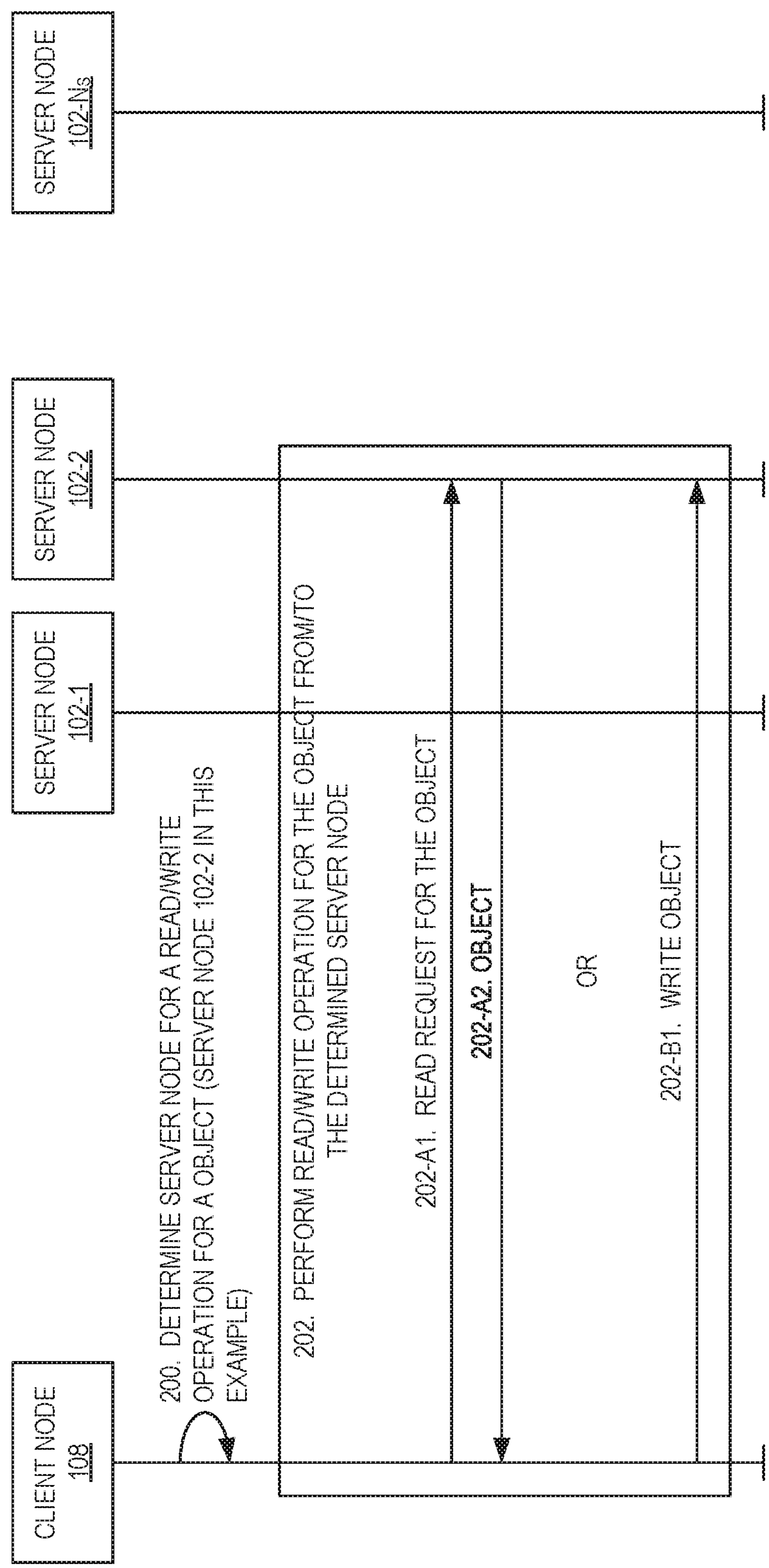
FIG. 2 illustrates the operation of a client node to perform a read or write operation for an object in accordance with some embodiments of the present disclosure.

FIG. 2 illustrates the operation of the client node 108 to perform a read or write operation for an object in accordance with some embodiments of the present disclosure. As illustrated, the client node 108 determines a server node 102 for a read/write operation for a particular object (step 200). The details of step 200 are provided below. However, in general, the client node 108, and in particular the storage client 112, generates at least a portion of a placement map for the object based on an object name of the object and the number ($N_S$) of server nodes 102 in the distributed storage system 100 in a deterministic manner. In this example, the placement map or portion of the placement map generated by the client node 108 for the object indicates that the server node 102-2 is the server node with respect to which the read/write operation should be performed.

The client node 108 performs the read/write operation for the object from/to the determined server node, which again in this example is the server node 102-2 (step 202). For a read operation, the client node 108 sends a read request to the server node 102-2 for the object (step 202-A1) and the server node 102-2 responds with the object (step 202-A2). For a write operation, the client node 108 writes the object to the server node 102-2 (step 202-B1). Notably, multiple replicas of the object are written to corresponding locations in accordance with the placement map for the object. In some embodiments, the client node 108 writes the primary replica to the server node 102-2 and the server nodes 102 then operate together in any suitable manner to copy the other replicas of the object to the appropriate locations. In some other embodiments, the client node 108 writes all of the replicas of the object to the appropriate locations in accordance with the placement map for the object. For instance, the client node 108 writes the primary replica to the server node 102-2 in step 202-B1 and then writes the other replicas of the object to at least some of the other server nodes 102 in accordance with the placement map for the object.

Figure 3:
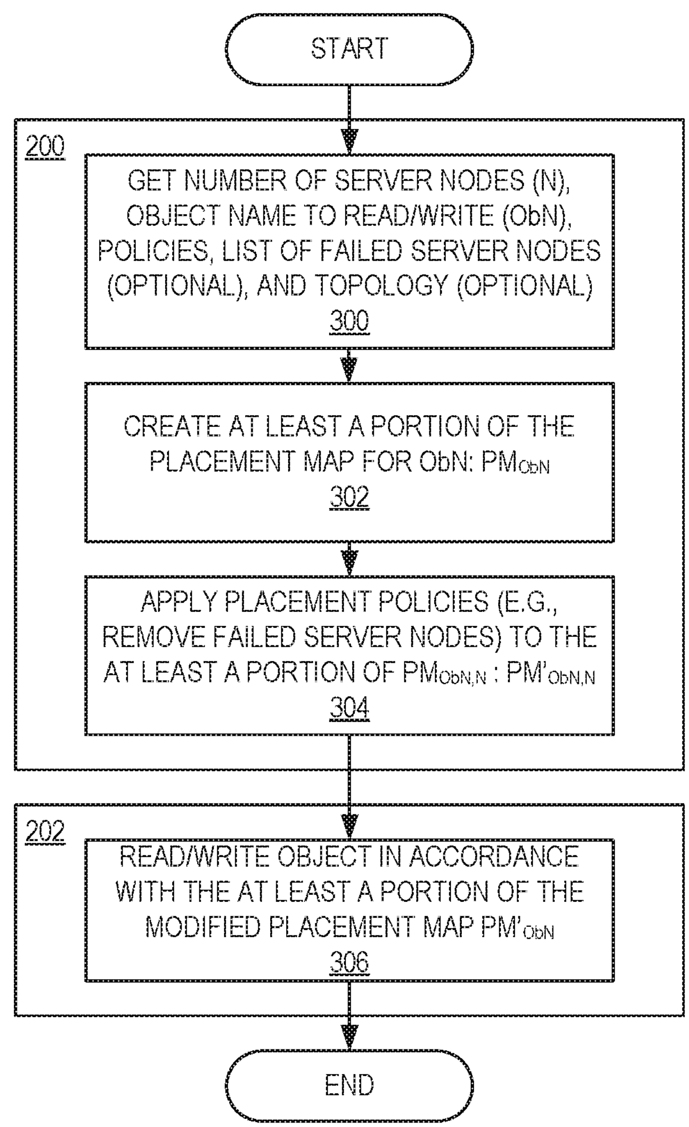
FIG. 3 is a flow chart that illustrates a method for a client node to perform steps 200 and 202 of FIG. 2 in more detail according to some embodiments of the present disclosure.

FIG. 3 is a flow chart that illustrates a method for the client node 108 to perform steps 200 and 202 of FIG. 2 in more detail according to some embodiments of the present disclosure. As illustrated, in order to determine the server node 102 for the read/write operation for the object, the client node 108 gets (i.e., obtains) the number ($N_S$) of server nodes 102 in the distributed storage system 100, an object name (ObN) of the object for the read/write operation, one or more policies, a list of failed server nodes 102 (optional), and information regarding a topology of the distributed storage system 100 (optional), if any (step 300). In some embodiments, the client node 108 receives (e.g., via frequent update) an updated map for the distributed storage system 100. This map includes information that indicates the number ($N_S$) of server nodes 102 and, in some embodiments, the status of the server nodes 102. The status of the server nodes 102 can be used by the client node 108 to obtain the list of failed server nodes 102. This map may also include information regarding the topology of the distributed storage system 100. This map for the distributed storage system 100 is not the focus of the present disclosure and can be generated in any suitable manner. For example, a consensus procedure may be implemented in which each server node 102 periodically sends a message (e.g., a heartbeat message) to at least one of the other server nodes 102 or to another node. Using the heartbeat messages, the server node(s) 102 or some other node is able to generate the map for the distributed storage system 100, where this map includes an indication of the number of server nodes 102 in the distributed storage system 100 as well as the status of the server nodes 102 (e.g., active or failed). The node that generates the map can then distribute the map to the client device 108 and the server nodes 102. Note that a new server node 102 can announce its presence in a similar way by sending an appropriate message to the server node 102/other node that generates the map.

The client node 108 generates at least a portion of the placement map ($PM_{ObN}$) for the object (step 302). The placement map for the object is referred to herein as $PM_{ObN}$. In many of the embodiments described herein, the placement map for the object is a three-dimensional (3D) table that defines multiple candidate locations for each of multiple replicas of the object for each of multiple possible values for the number ($N_S$) of server nodes 102 in the distributed storage system 100. As an example, the client node 108 generates the portion of the placement map for the object that is relevant to the situation where the number of server nodes 102 is $N_S$ (i.e., for the 3D table embodiments, the multiple candidate locations for each of the multiple replicas of the object for only the obtained value of $N_S$), where this portion is referred to herein as $PM_{ObN,Ns}$. The portion of the placement map that defines the candidate locations for the replicas of the object for a single possible value of $N_S$ is referred to herein as a "slice" of the placement map. As another example, a portion of the placement map generated by the client node 108 is the portion of the placement map that defines the multiple candidate locations for only one particular replica of the object for only the obtained value of $N_S$.

In some embodiments, the placement map $PM_{ObN}$ is a two-dimensional (2D) table that provides a value ($C_{i,j}$) for a number of replicas (indexed by i) of the object for each of a number of possible values of $N_S$ (indexed by j). The value $C_{i,j}$ is an index of the server node 102 on which the i-th replica of the object is to be stored if $N_s$=j. As used herein, an index to a server node 102 can be any information that references, points to, or otherwise identifies the server node 102. One example of a 2D placement map is shown below in Table 1. As illustrated, the rows of the 2D placement map are for different replicas of the object and the columns of the 2D placement map are for different possible values of $N_S$. The first row is for the primary copy/replica of the object. The other rows are for other replicas of the object.

TABLE 1

2D Placement Map

| | | Possible Number of Server Nodes (index j) | | | |
|---|---|---|---|---|---|
| | | j = 1 | j = 2 | . . . | j = N |
| Replica (index i) | i = 1 | $C_{1,1}$ | $C_{1,2}$ | . . . | $C_{1,N}$ |
| | i = 2 | $C_{2,1}$ | $C_{2,2}$ | . . . | $C_{2,N}$ |
| | . | . | . | . | . |
| | . | . | . | . | . |
| | . | . | . | . | . |
| | i = R | $C_{R,1}$ | $C_{R,2}$ | . . . | $C_{R,N}$ |

Figure 4:
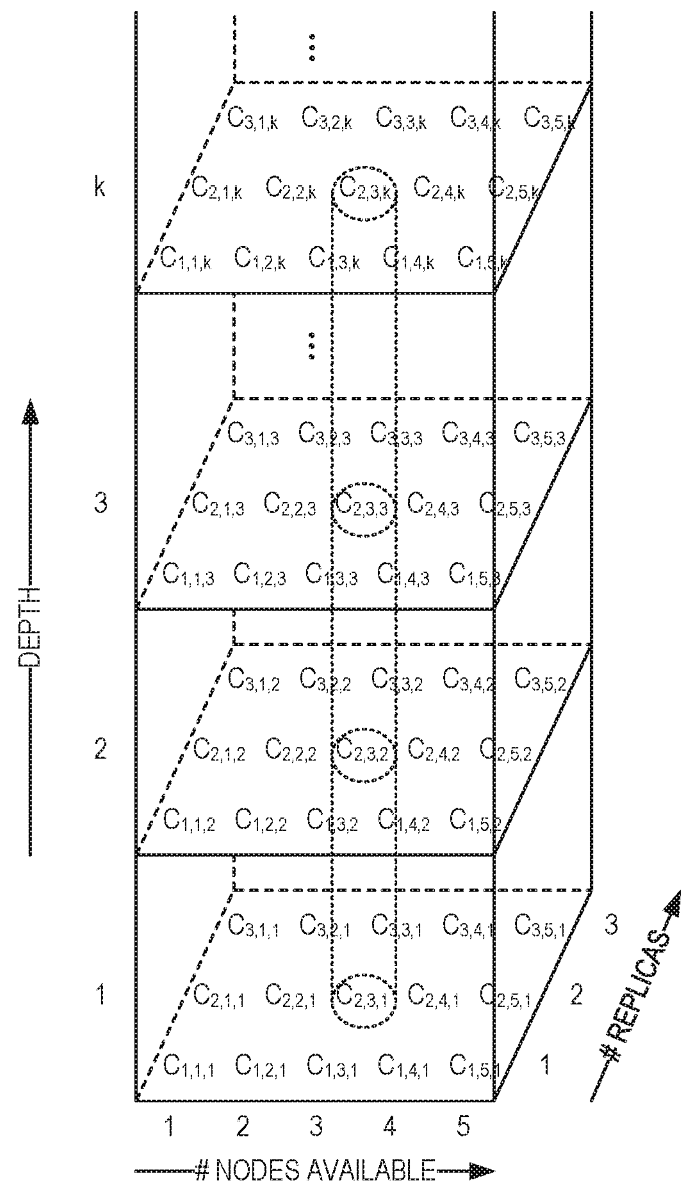
FIG. 4 illustrates one example of a three-dimensional (3D) placement map for an object in accordance with some embodiments of the present disclosure.

However, in the preferred embodiments, the placement map $PM_{ObN}$ is a 3D table, or cube, that provides a value ($C_{i,j,k}$) for a number of candidate locations (indexed by k) of replicas (indexed by i) of the object for each of a number of possible values of $N_S$ (indexed by j). The value $C_{i,j,k}$ is an index that defines a k-th candidate location for the i-th replica of the object is to be stored if $N_s$=j. As an example, the value of $C_{i,j,k}$ for k=1 is the index of the server node 102 on which the i-th replica of the object is to be stored if $N_s$=j. The other candidate locations for k=2, . . . , D are other candidate locations that can be used when applying one or more policies. One example of a 3D placement map is illustrated in FIG. 4. As illustrated, the 3D placement map is similar to the 2D placement map but further includes a depth dimension (indexed by k) to define a number (D) of candidate locations for each position in the 2D placement map. As an example, the values $C_{2,3,1}$, $C_{2,3,2}$, . . . , $C_{2,3,k}$, . . . , $C_{2,3,D}$ define D candidate locations for the server node 102 to store the second replica of the object when $N_S$=3.

The placement map has the following features:

- It is reproducible randomly (with respect to the object's name) so the objects are evenly distributed:
  - If two objects have names that are similar to each other (with respect to some metric(s)), their placement maps are similar to each other.
  - If an object name is given, the placement map for that object should be reproducible and also be unique across time and also location. In other words, the procedure used to generate the placement map for the object should be frozen (i.e., should not change based on any parameter for any given object name) and deterministic.
- The locations of the replicas as defined by the placement map are also reproducible randomly such that the replicas of the object are also evenly distributed while the correlation of two replicas of an object being on a same server is minimum and also correlation of recurrence of two replicas of two different objects on another server is also minimum.
- The placements for the primary copy/replica of the object and other replicas of the object are calculated in a way that if a server node is added to or deleted from the cluster only a minimum amount of data will be moved without the need for tracking of the data, and the resulting cluster will be completely balanced towards default or forced by policy configuration. Here, default means no policy and uniformly distributed. Application of a policy may have an impact on the distribution.
- The placements for the primary copy/replica of the object and other replicas of the object are calculated in a way that if an (or more than one) arbitrary server node(s) is(are) failed in the cluster only minimum data will be moved without the need for tracking of the data, and the resulting cluster will be completely balanced towards default or forced by policy configuration.
- In the placement of the objects, weight of servers and topology of the cluster can be considered, in some embodiments.

Returning to FIG. 3, after creating the at least a portion of the placement map for the object, the client node 108 applies one or more policies to the at least a portion of the placement map $PM_{ObN}$ for the object to generate at least a portion of a modified placement map $PM'_{ObN}$ for the object (step 304). While the application of policies is described in detail below, one example is given here to assist in understanding. As an example, the one or more policies may include a policy to remove any failed server nodes 102 from the placement map $PM_{ObN}$. In this case, values in the placement map $PM_{ObN}$ that reference a failed server node are removed and replaced with values that reference non-failed server nodes in a deterministic manner. For example assuming that the placement map $PM_{ObN}$ is the 3D table of FIG. 4, in some embodiments, any values $C_{i,j,k}$ that index a failed server node are removed and replaced by shifting values in the depth-dimension. For instance, if the value $C_{2,3,1}$ indexes a failed server node 102, then the value $C_{2,3,1}$ is replaced by the value $C_{2,3,2}$, the value $C_{2,3,2}$ is replaced by the value $C_{2,3,3}$, and so on such that the new value for $C_{2,3,1}$ is equal to the previous value of $C_{2,3,2}$, the new value for $C_{2,3,2}$ is equal to the previous value for $C_{2,3,3}$, and so on.

Lastly, the client node 108 performs the read/write operation for the object in accordance with the modified placement map $PM'_{ObN}$ (step 306). In other words, the client node 108 reads/writes a desired replica of the object from/to the server node 102 indicated in the at least a portion of the modified placement map $PM'_{ObN}$ for the object.

Figure 5:
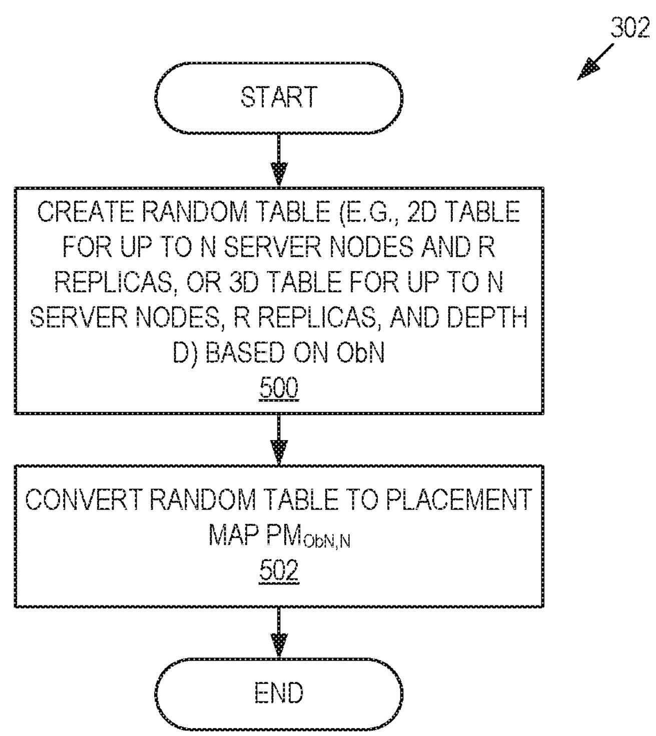
FIG. 5 illustrates step 302 of FIG. 3 in more detail in accordance with some embodiments of the present disclosure.
Figure 6:
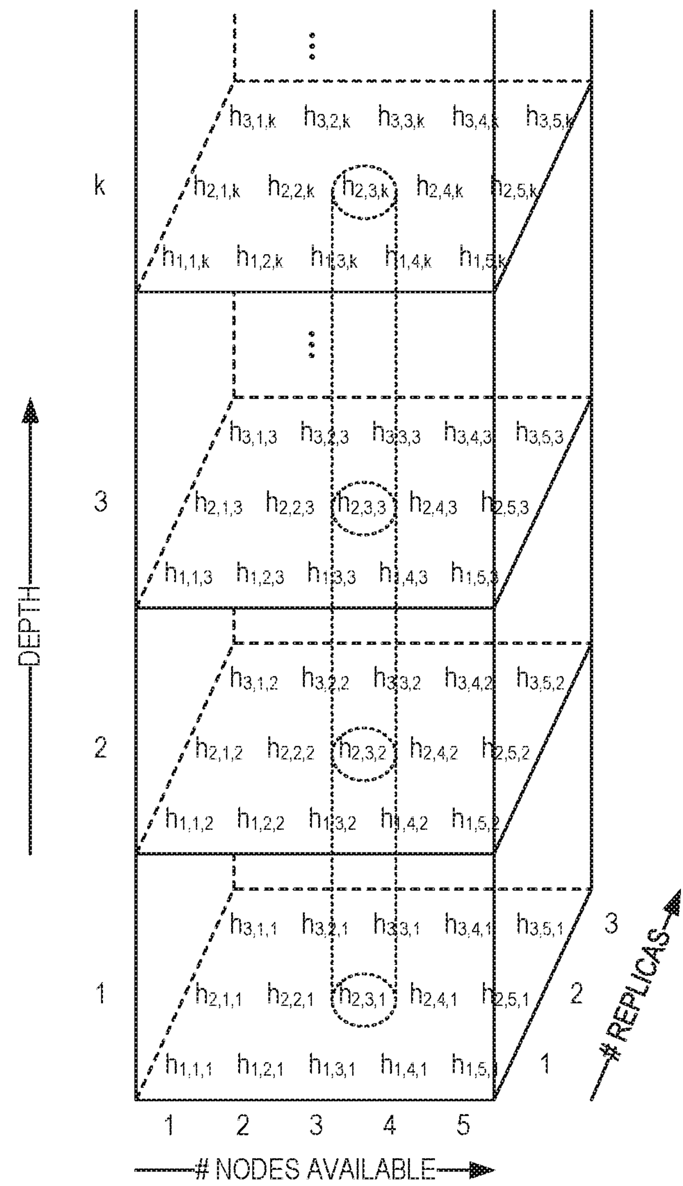
FIG. 6 illustrates one example of a 3D random table for an object in accordance with some embodiments of the present disclosure.

FIG. 5 illustrates step 302 of FIG. 3 in more detail in accordance with some embodiments of the present disclosure. Notably, the process of FIG. 5 generates the full placement map $PM_{Ob}$. However, this process may also be used to generate any desired portion of the placement map $PM_{ObN}$ (e.g., to generate only the portion of the placement map $PM_{ObN}$ that is relevant to the current value for $N_S$). As illustrated, in order to generate (i.e., create) the placement map for the object, the client node 108 creates a reproducible random table based on the object name (ObN) of the object (step 500). For a 3D placement map, the reproducible random table is a 3D random table. One example of a 3D random table is illustrated in FIG. 6. As illustrated in FIG. 6, the 3D random table includes random values $h_{i,j,k}$ for i=1, . . . , R, j=1, . . . , N, and k=1, . . . , D, where R is the integer number of replicas desired for the object, N is an integer representing a maximum possible number of server nodes 102 (i.e., $N_S \leq N$), and D is an integer representing the number of candidate locations in the depth dimension. The random table is reproducible in the sense that the random table will always be the same when generated for a particular object name. The random values $h_{i,j,k}$ for i=1, . . . , R, j=1, . . . , N, and k=1, . . . , D are all different from one another. In other words, there are no repeating values in the random table.

Any suitable procedure may be used to generate the random table. One example is the use of three different hashing functions: hash1( ), hash2( ), and hash3( ). The random value $h_{i,j,k}$ can then be computed as follows:

$h_{i,j,k}$=hash1(ObN)
for m=1 to i
  $h_{i,j,k}$=hash1($h_{i,j,k}$)
for m=1 to j
  $h_{i,j,k}$=hash2($h_{i,j,k}$)
for m=1 to k
  $h_{i,j,k}$=hash3($h_{i,j,k}$)

The hashing functions hash1( ), hash2( ), and hash3( ) can be any suitable hashing functions such as, for example, a 256 bit Secure Hash Algorithm (SHA-256), a Jenkins hash function, Message Digest (MD) hash such as MD5, or the like.

Figure 7:
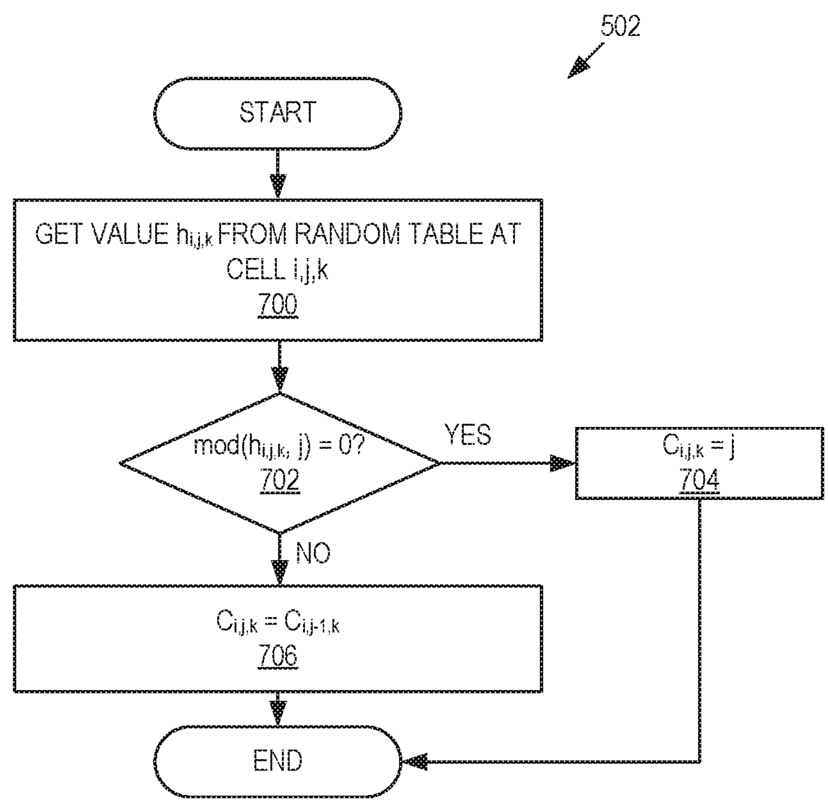
FIG. 7 illustrates one example of a process for converting a random table for an object into the placement map for the object in accordance with some embodiments of the present disclosure.

Returning to FIG. 5, the client node 108 then converts the random table to the placement map $PM_{ObN}$ for the object (step 502). FIG. 7 illustrates one example of a process for converting the random table to the placement map $PM_{ObN}$ in accordance with some embodiments of the present disclosure. FIG. 7 illustrates the process for converting a single random value $h_{i,j,k}$ from the random table into a corresponding value $C_{i,j,k}$ in the placement map. This process is repeated for each random value in the random table or each random value in the portion of the random table to be converted into the (portion of) the placement map $PM_{ObN}$. As illustrated, the client node 108 gets the random value $h_{i,j,k}$ from the random table (step 700) and determines whether mod($h_{i,j,k}$, j)=0 (step 702). If mod($h_{i,j,k}$, j)=0 (step 702, YES), the client node 108 sets $C_{i,j,k}$ in the placement map $PM_{ObN}$ equal to j (i.e., a value that references the j-th server node 102-*j*) (step 704). However, if mod($h_{i,j,k}$, j) is not equal to zero (step 702, NO), the client node 108 sets $C_{i,j,k}$ in the placement map $PM_{ObN}$ equal to $C_{i,j-1,k}$ (step 706). If $C_{i,j-1,k}$ has not already been calculated by the client node 108, the client node 108 calculates $C_{i,j-1,k}$ using the procedure of FIG. 7 (i.e., gets the value $C_{i,j-1,k}$ from the random table and determines whether mod($h_{i,j-1,k}$, j−1)=0, set $C_{i,j-1,k}$=j−1 if true and otherwise set $C_{i,j-1,k}$=$C_{i,j-2,k}$). In other words, step 706 is a recursive function that continues until the value mod($h_{i,j-q,k}$, j−q)=0, where at the first level of the recursion q=1, at the second level of the recursion q=2, and so on. Once the value for $C_{i,j,k}$ is determined, the process of FIG. 7 can be repeated for each other value in the placement map $PM_{ObN}$ or each other value in the desired portion of the placement map $PM_{ObN}$.

Figure 8:
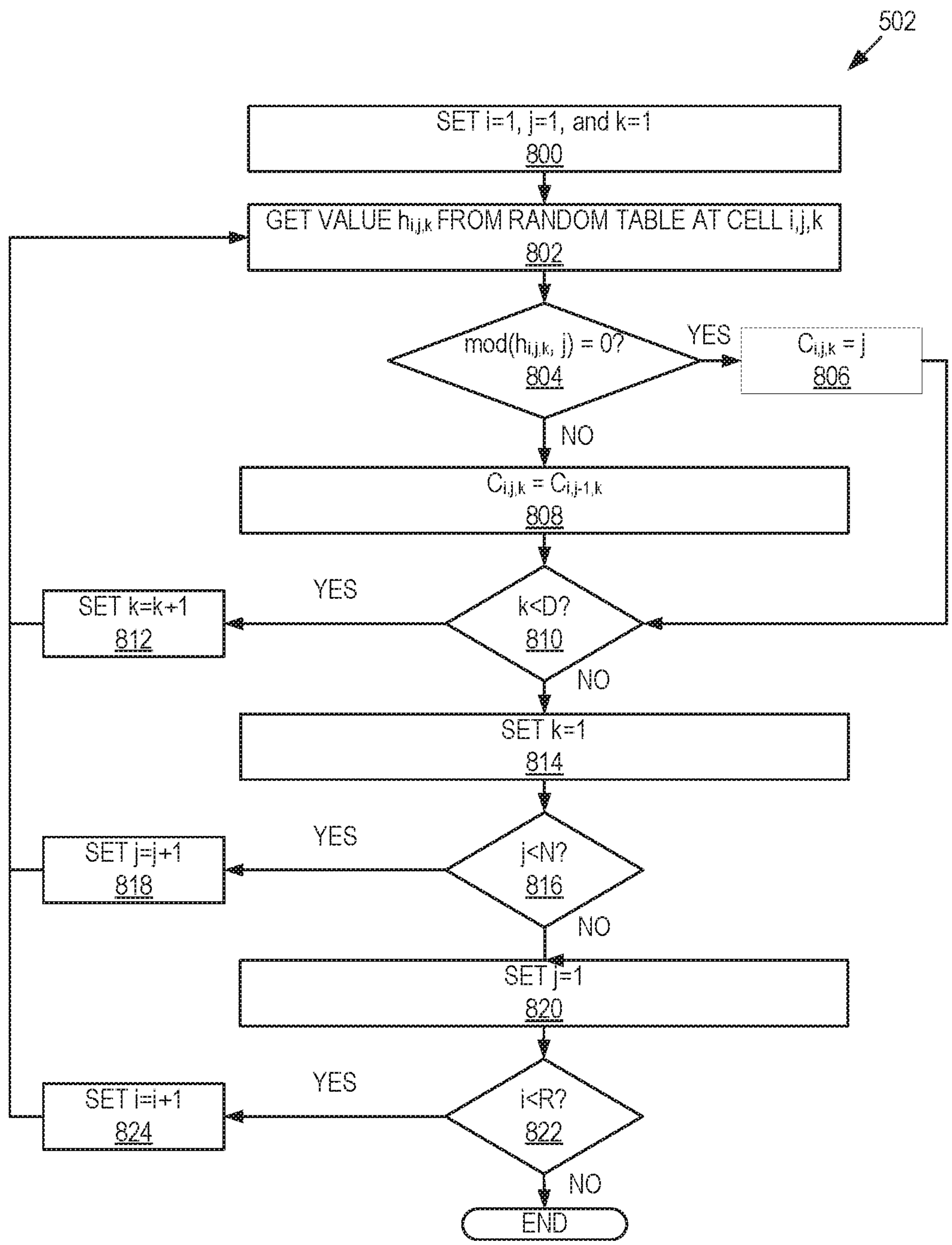
FIG. 8 illustrates another example of a process for converting a random table for an object into the placement map for the object in accordance with some embodiments of the present disclosure.

FIG. 8 is a flow chart that illustrates a process whereby the client node 108 computes the full placement map $PM_{ObN}$ (i.e., computes $C_{i,j,k}$ for all values of i, j, and k) in accordance with some embodiments of the present disclosure. This process is substantially the same as that of FIG. 7 but explicitly shows computing all of the values in the placement map $PM_{ObN}$. As illustrated, indices i, j, and k are initialized to a value of 1 (step 800). The client node 108 gets the random value $h_{i,j,k}$ from the random table (step 802) and determines whether mod($h_{i,j,k}$, j)=0 (step 804). If mod($h_{i,j,k}$, j)=0 (step 804, YES), the client node 108 sets $C_{i,j,k}$ in the placement map $PM_{ObN}$ equal to j (i.e., a value that references the j-th server node 1021) (step 806). However, if mod($h_{i,j,k}$, j) is not equal to zero (step 804, NO), the client node 108 sets $C_{i,j,k}$ in the placement map $PM_{ObN}$ equal to $C_{i,j-1,k}$ (step 808).

Next, whether proceeding from step 806 or 808, the client node 108 determines whether k<D (step 810). If so (step 810, YES), the client node 108 increments index k (step 812) and the process returns to step 802. Once k≥D (step 810, NO), the client node 108 resets the index k to a value of 1 (step 814) and determines whether j<N (step 816). If j<N (step 816, YES), the client node 108 increments the index j (step 818) and the process returns to step 802 and is repeated. Once j≥N (step 816, NO), the client node 108 resets the index j to a value of 1 (step 820) and determines whether i<R (step 822). If i<R (step 822, YES), the client node 108 increments the index i (step 824) and the process then returns to step 802 and is repeated. Once i≥R (step 822, NO), the value $C_{i,j,k}$ for all values of i, j, and k have been computed. At this point, the random table has been fully converted into the placement map $PM_{ObN}$ for the object and the process ends.

Figure 9:
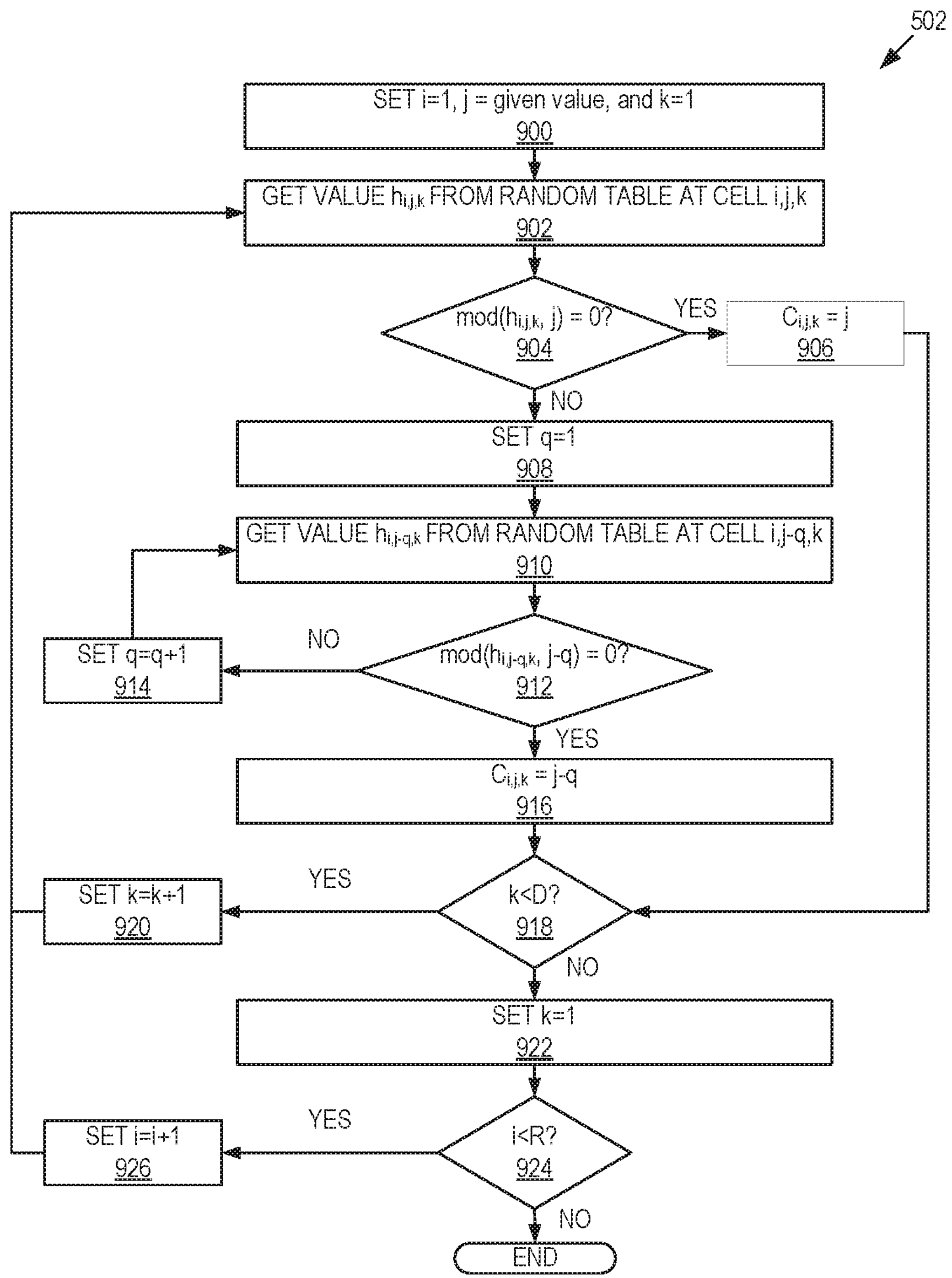
FIG. 9 illustrates another example of a process for converting a random table for an object into the placement map for the object in accordance with some embodiments of the present disclosure.

As discussed above, the full placement map does not have to be created in all embodiments. For instance, in some embodiments, the client node 108 may generate a portion of the placement map. For example, because the client node 108 knows the number ($N_S$) of server nodes 102, the client node 108 may generate only the portion of the placement map that is relevant when the number of server nodes 102 is equal to $N_S$ (i.e., generate only the portion of the placement map for j=$N_S$). In this regard, FIG. 9 illustrates one example of a process by which the client node 108 generates the portion of the placement map for j=$N_S$ (or for any given value of j). As illustrated, indices i and k are initialized to a value of 1 and the index j is set to a given value (e.g., the value of $N_S$) (step 900). The client node 108 gets the random value $h_{i,j,k}$ from the random table (step 902) and determines whether mod($h_{i,j,k}$, j)=0(step 904). If mod($h_{i,j,k}$, j)=0 (step 904, YES), the client node 108 sets $C_{i,j,k}$ in the placement map $PM_{ObN}$ equal to j (i.e., a value that references the j-th server node 102-*j*) (step 906).

If $\mathrm{mod}(h_{i,j,k}, j)$ is not equal to zero (step 904, NO), the client node 108 sets $C_{i,j,k}$ in the placement map $PM_{ObN}$ equal to $C_{i,j-1,k}$. Since in this example the value of $C_{i,j-1,k}$ has not already been computed, the client node 108 computes the value of $C_{i,j-1,k}$ and set $C_{i,j,k}$ to this value. Note, however, that in some embodiments the client node 108 caches previously computed values and does not perform the following steps (908-916) to compute the value of $C_{i,j-1,k}$ if that value has previously been computed and is stored in cache. However, assuming that the value of $C_{i,j-1,k}$ needs to be computed, the client node 108 sets an index q to a value of 1 (step 908), gets the value $h_{i,j-q,k}$ from the random table (step 910), and determines whether $\mathrm{mod}(h_{i,j-q,k}, j-q)=0$ (step 912). If $\mathrm{mod}(h_{i,j-q,k}, j-q)=0$ (step 912, YES), the client node 108 sets $C_{i,j,k}$ in the placement map $PM_{ObN}$ equal to j−q (i.e., a value that references the (j−q)-th server node 102-(j−q)) (step 916). If $\mathrm{mod}(h_{i,j-q,k}, j-q)$ is not equal to zero (step 912, NO), the client node 108 increments the index q (step 914) and returns to step 910.

Whether proceeding from step 906 or step 916, once the value for $C_{i,j,k}$ is set, the client node 108 determines whether k<D (step 918). If so (step 918, YES), the client node 108 increments index k (step 920) and the process returns to step 902. Once k≥D (step 918, NO), the client node 108 resets the index k to a value of 1 (step 922) and determines whether i<R (step 924). If i<R (step 924, YES), the client node 108 increments the index i (step 926) and the process then returns to step 902 and is repeated. Once i≥R (step 924, NO), the value $C_{i,j,k}$ for all values of i and k and the given value of j have been computed. At this point, the portion of the placement map $PM_{ObN}$ that is relevant to the given value of j has been created and the process ends.

The function $\mathrm{mod}(h_{i,j,k}, j)=0$ used in the processes of FIGS. 7 through 9 to convert values in the random table into values in the placement map for the object is effective and achieves the desired goals for the data mapping procedure. In general, when a server node 102 is added, removed, or fails, the function results in data being moved from some server nodes ($\mathrm{mod}(h_{i,j,k}\, j)=0$) and keeps the rest on the same nodes. If the random table is created correctly and there is no correlation between numbers in the rows and columns, there should be around $1/N_S$ nodes that matches the $\mathrm{mod}(h_{i,j,k}\, j)=0$ condition (for $j=N_S$) to be moved to the new server node 102 when a new server node 102 is added. Further, these $1/N_S$ nodes from which data is to be moved to the new server node 102 should come uniformly from all the server nodes 102 from server node 102-1 to server node 102-($N_S$−1). Further, there is no traffic generated between any of the server nodes 102-1 to 102-($N_S$−1). When a server node 102 is not available, its data will simply go to the next available and not utilized replica node in the queue. More on this is explained below.

The placement map at layer 1 (i.e., for i=1) is used to place the object on the server nodes 102. However, other layers are helpful when, e.g., there is a failed server node, a heterogeneous system, or a policy is applied. Each of these situations is described below.

Node Failure: If a server node(s) 102 fails in the cluster, then references to that server node(s) 102 will be removed from the placement map, e.g., when applying the policy to remove failed server nodes 102 in step 304 of FIG. 3. This action will produce empty cells in all layers of the placement map. However, using the 3D placement map, finding the replacement value for an empty cell is easy. Each empty cell is filled with the value from the cell in the above layer (i.e., empty cell i, j, k in the 3D placement map is filled with the value from cell i, j, k+1). This replacement is a move action and not a copy action. This means that if there is a non-empty cell in the layer above (in the depth dimension), the value from that above layer is moved to the empty cell in the current layer, and then there will be an empty cell in the above layer. That empty cell can be filled by a value from a layer that is above that layer and so on. The overall action is like the values from higher layers are falling to fill empty cells in the lower layers. For example, after removing a reference to a failed server node in cell 1, 2, 1, the value from cell 1, 2, 2 is moved to cell 1, 2, 1, the value from cell 1, 2, 3 is moved to cell 1, 2, 2, and so on.

Policy Application: The process of policy application is simple and yet very powerful and effective. As discussed above, the 3D placement map includes many candidate locations for each replica of the object for each possible value of $N_S$. These candidate locations are provided in the depth dimension. The policies can be applied, e.g., in step 304 of FIG. 3, by accepting or rejecting some of the candidate locations in the depth dimension. Although some candidate locations are rejected based on the policies, the remaining candidate locations in the higher layers will replace them, as discussed above. Notably, because the modified placement map $PL'_{ObN}$ is generated based on the name of the object and information regarding the state of the distributed storage system 100 (e.g., the number ($N_S$) of server nodes 102 and the list of failed server nodes 102), every entity in the distributed storage system 100 including the server nodes 102 and the client node 108 should produce exactly the same modified placement map $PM'_{ObN}$ after application of the policies.

The removal of failed server nodes 102 from the placement map is only one example of a policy. Additional or alternative policies may be applied, e.g., in step 304 of FIG. 3. For example, in some embodiments, a policy is applied to limit the repetition of the server nodes 102 in the replica dimension of the placement map of the object until all the server nodes 102 in the cluster appear once. Assuming the 3D placement map, this policy may be achieved using the multiple candidate locations for each replica of the object for each possible value of $N_S$. For instance, if the value $C_{1,3,1}$ is equal to a value that references the server node 102-2 and the value $C_{2,3,1}$ (before applying the policy) is also equal to a value that references the server node 102-2, then the value in cell 2,3,1 of the placement map is removed and the values in cell 2,3,2, cell 2,3,3, cell 2,3,4, etc. are shifted such that the value in cell 2,3,2 is moved to cell 2,3,1 and therefore becomes the new value $C_{2,3,1}$, the value in cell 2,3,3 is moved to cell 2,3,2 and becomes the new value for $C_{2,3,2}$, and so on. Assuming that the new value for $C_{2,3,1}$ is a value that references a server node 102 other than the server node 102-2, the policy is then applied to the value $C_{3,3,1}$ such that the value $C_{3,3,1}$ after applying the policy does not reference either the server node 102-1 or the server node 102 referenced by the value $C_{2,3,1}$. The result of application of the policy is that for a given value of the index j, the first j replicas of the object will be placed on the server nodes 102-1 through 102-*j* (e.g., for j=3, there are no repeating values $C_{1,3,1}$ through $C_{3,3,1}$). By removing repeating references for at least the first j replicas minimizes the risk of replicating the same object multiple times on an identical node.

Additional or alternative policies may also be applied such as, for example, one or more policies that provide support for an availability zone(s). More details are provided in this regard in the "Topology Support" section below.

Weighting—Heterogeneous vs Homogeneous: So far, it has been assumed that the server nodes 102 are similar (e.g., homogeneous) in terms of network, processing, storage, and memory capabilities. However, in some implementations, at least some of the server nodes 102 may be dissimilar in terms of network, processing, storage, and/or memory capabilities (i.e., there may be a heterogeneous environment). In some embodiments, one or more policies are applied e.g., in step 304 of FIG. 3 to improve performance in a heterogeneous environment e.g., by weighting the server nodes 102 in accordance with their respective capabilities such that server nodes 102 having higher capabilities appear more often in the placement mapping for the object.

For instance, if the server nodes 102 have different capacities in terms of storage and/or network bandwidth or data rates, one or more policies can be applied such that, in the modified placement map after applying these one or more policies, the server nodes 102 with higher capacity appear more often than the server nodes with lower capacity in the set of candidate locations defined in the depth dimension for each replica of the object for each possible value of $N_S$. In this way, the server nodes 102 with higher capacity are utilized in a more efficient way and yet the same data mapping procedure is used with the same uniformity features.

More specifically, in some embodiments, one or more policies are defined to support weighting of the server nodes 102. In some embodiments, weights can be assigned to each storage device 106 in each server node 102. The weights can be assigned in any suitable manner. For example, in some embodiments, the weights are assigned by an administrator. The weights represent the preference of placing data on the corresponding storage devices 106. The total weight of a server node 102 can be the sum of the weights of all the storage devices 106 installed on that server node 102. This can be used to support topology based policies, which are discussed below.

In some embodiments, all weights are normalized to the range [0, 1]. In some embodiments, a weighting based policy is applied, e.g., in step 304 of FIG. 3, as follows. First, a hash function, y=hash4(ObN,i,j,k), is introduced. The hash function hash4(ObN,i,j,k) produces a random value ranging in [0,1] by taking the object name (ObN), number of nodes in the cluster j, replica number i, and candidate location number k as the input. Then, given a threshold weight (w), all of the values $C_{i,j,k}$ that satisfy hash4(ObN,i,j,k)<w will remain in the placement map and the rest will be removed. The empty cells in the placement map for the removed values are then filled by shifting the candidate locations for each replica for each possible value j, as described above. The resulting modified placement map can then be processed against other policies, if any, to further modify the placement map.

Topology Support: Infrastructures are usually hierarchical, e.g., a cluster might have a hierarchy consisting of rows, cabinets, and shelves of disks. The procedure of FIG. 3 can support topology by combining weighting and one or more additional topology-based policies. By applying weighting, the weight of an entity is the total weight of its all sub-entities, e.g., the total weight of a server node 102 can be the sum of the weights of all the storage devices 106 installed on that server node 102, the weight of a cabinet is the sum of the weights of all the server nodes 102 in that cabinet, and so on. Meanwhile, when supporting topology, policies can be adopted to determine the behavior of the procedure of FIG. 3, e.g., excluding a specific cabinet from candidate location selection.

In fact, topology will make it easy to define policies. For example, with support of topology, the one or more policies applied in step 304 of FIG. 3 can include one or more of the following:

- Do not place replicas of an object on the same availability zone. An availability zone is a portion (physical or logical) of the cluster having a defined availability (e.g., high availability). For example, the cluster may be divided (physically or logically) into a number of availability zones. Further, as an example, each availability zone may have a separate power source.
- Only use a specific hardware to host a particular tenant's (e.g., user's) objects.
- Place a series of objects in the same server node 102. The same can be true for their replicas.
- Do not place objects on the same cabinets, unless there is replica in a server node 102 within three hops away and another replica in a row (e.g., rack) with a separate electricity source. This is only one example. Any combination of rules can be used.

Figure 10:
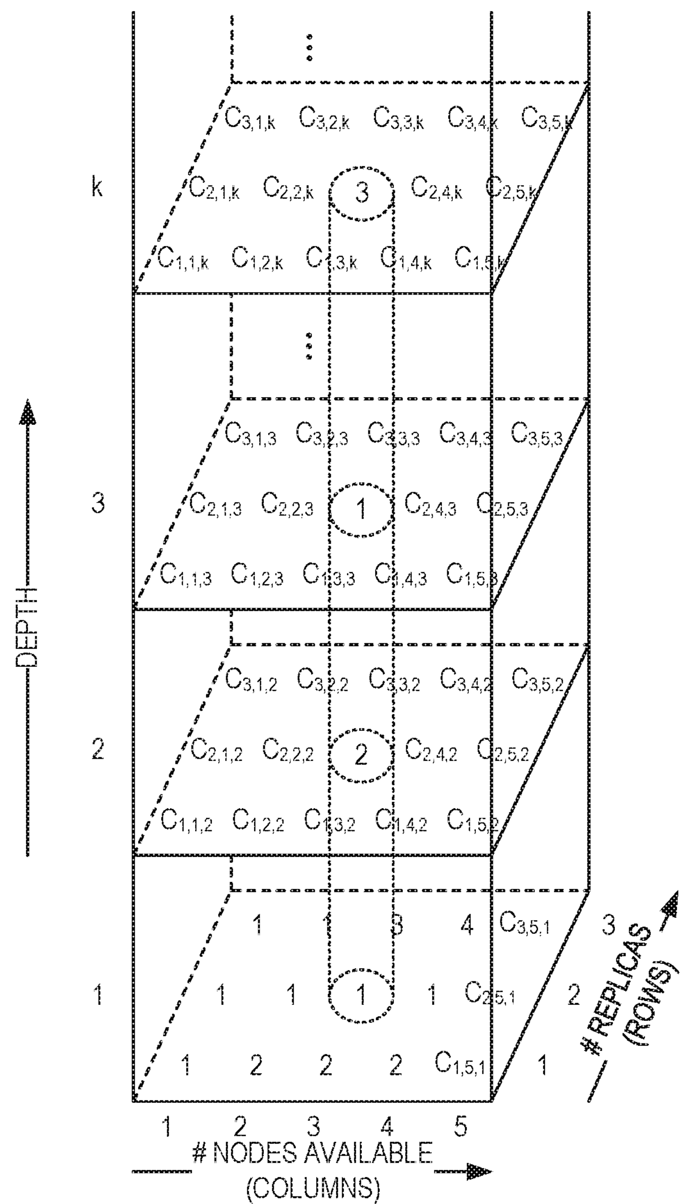
FIG. 10 illustrates one example of a 3D placement map for an object in accordance with some embodiments of the present disclosure.

Example: An example of a placement map for a particular object is shown in FIG. 10. The way one should interpret the placement map is that if the client node 108 is trying to read/write, the client node 108 should connect to the server node 102 indicated by $C_{1,j,1}$ for $j=N_S$ (i.e., the server node 102 for the first replica of the object for $j=N_S$) unless that server node 102 is unavailable. If the server node 102 for the first replica is unavailable, then the client node 108 tries the server node 102 for the second replica (i.e., the server node 102 indicated by $C_{2,j,1}$) and so on. For example, if the client node 108 is trying to write the object and the number of server nodes is three (i.e., $N_S=3$), the client node 108 should, in the example of FIG. 10, connect to the server node 102-2 (i.e., the server node 102 referenced by the number 2). When the server node 102-2 receives the object from the client node 108, the server node 102-2 stores the object. Further, in some embodiments, the server node 102-2 uses the placement map to copy the other replicas of the object to the other server nodes 102 (i.e., the server node 102-1 and 102-3 in the example of FIG. 10).

If the number of server nodes 102 in the cluster changes, some data will move to rebalance the cluster. For example, if we consider the same object as the last example, if the number of server nodes 102 changes from three to four (i.e., if $N_S$ changes from 3 to 4), replica number 1 and replica number 2 will not move. However, replica number 3 will be moved from server node 102-3 to server node 102-4.

Figure 11:
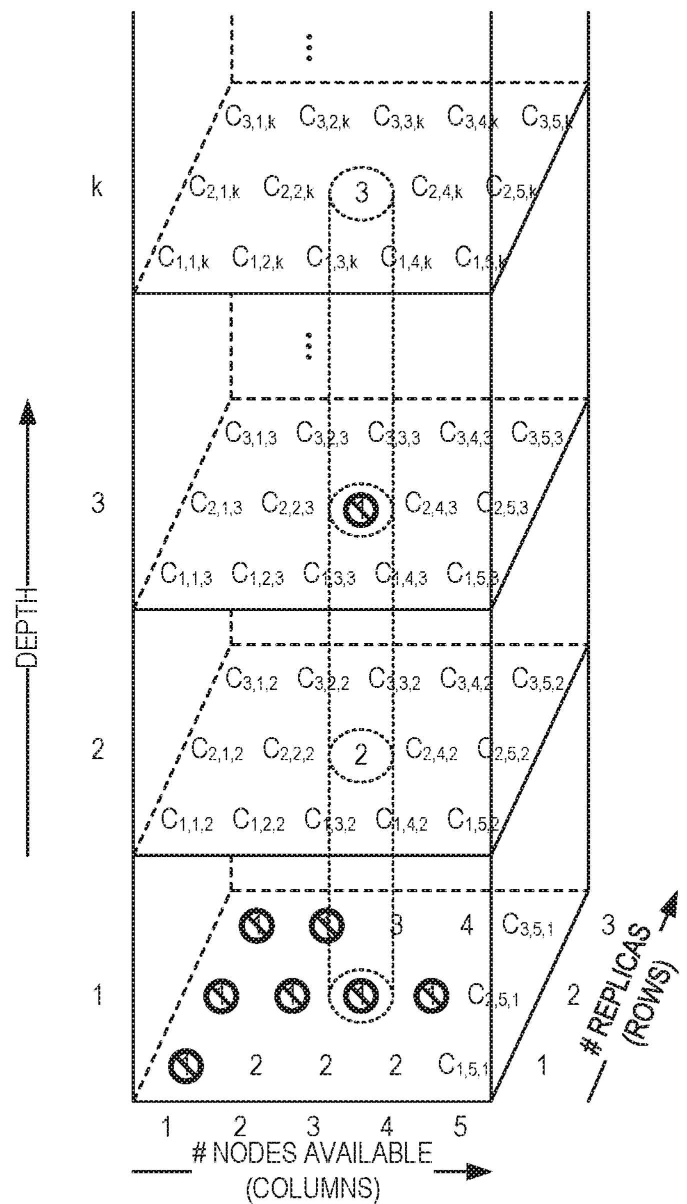
FIGS. 11 through 13 illustrate updating of the 3D placement map of FIG. 10 to remove references to a failed server node in accordance with some embodiments of the present disclosure.
Figure 12:
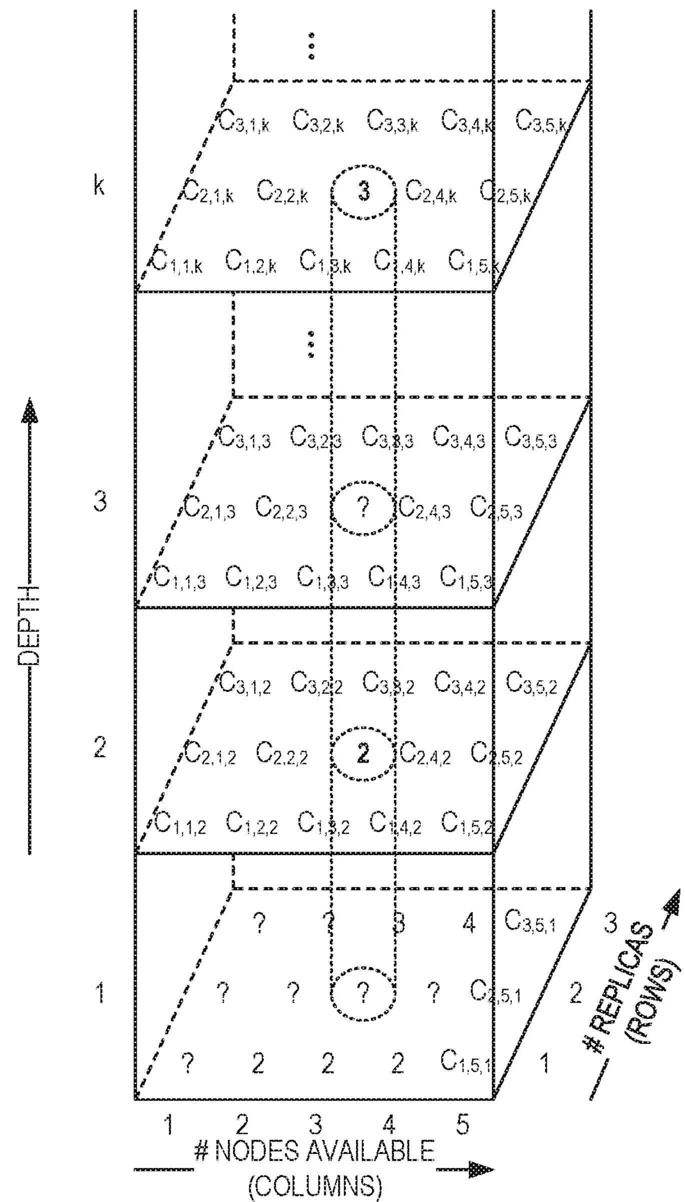
Figure 13:
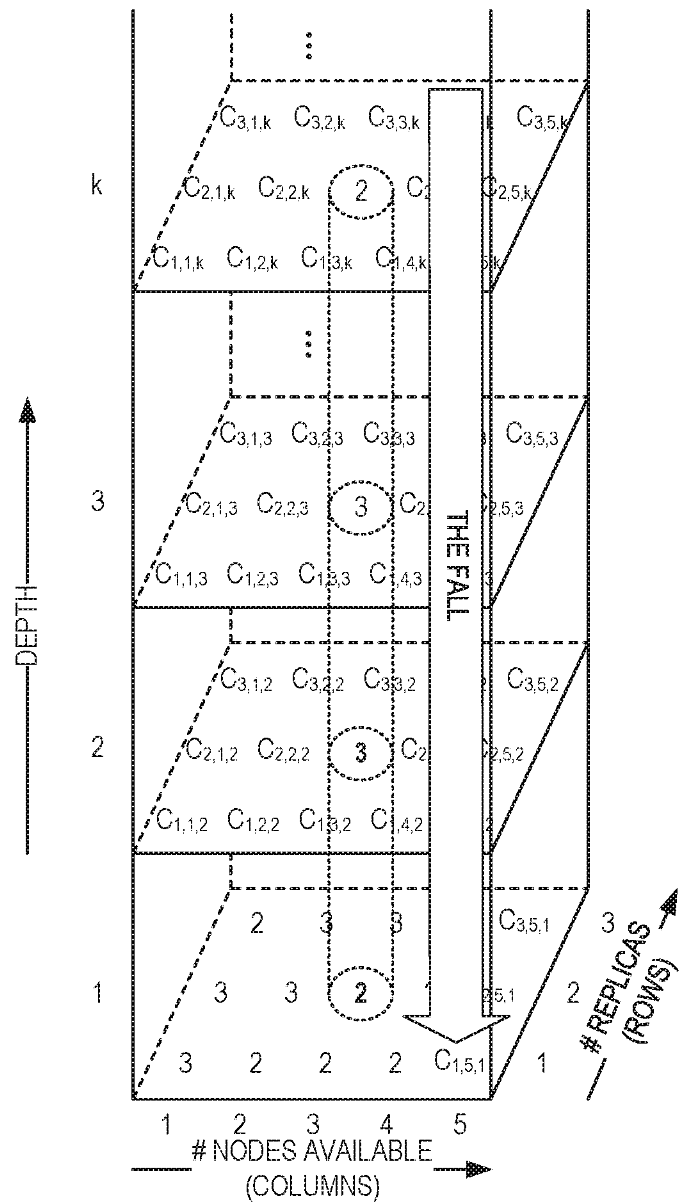

In case of failure of the server node 102-1, the replica candidate locations from the above layers in the depth dimension will fall down to fill the empty spaces, as illustrated in FIGS. 11 through 13. In particular, FIG. 11 highlights the values in the placement map that reference the failed server node 102-1 and are to be removed. FIG. 12 shows empty cells in the placement map due to the removal of the values that reference the failed server node 102-1. FIG. 13 shows how the candidate locations in the depth dimension are shifted to fill the empty cells, thereby providing new values for those cells.

Figure 14:
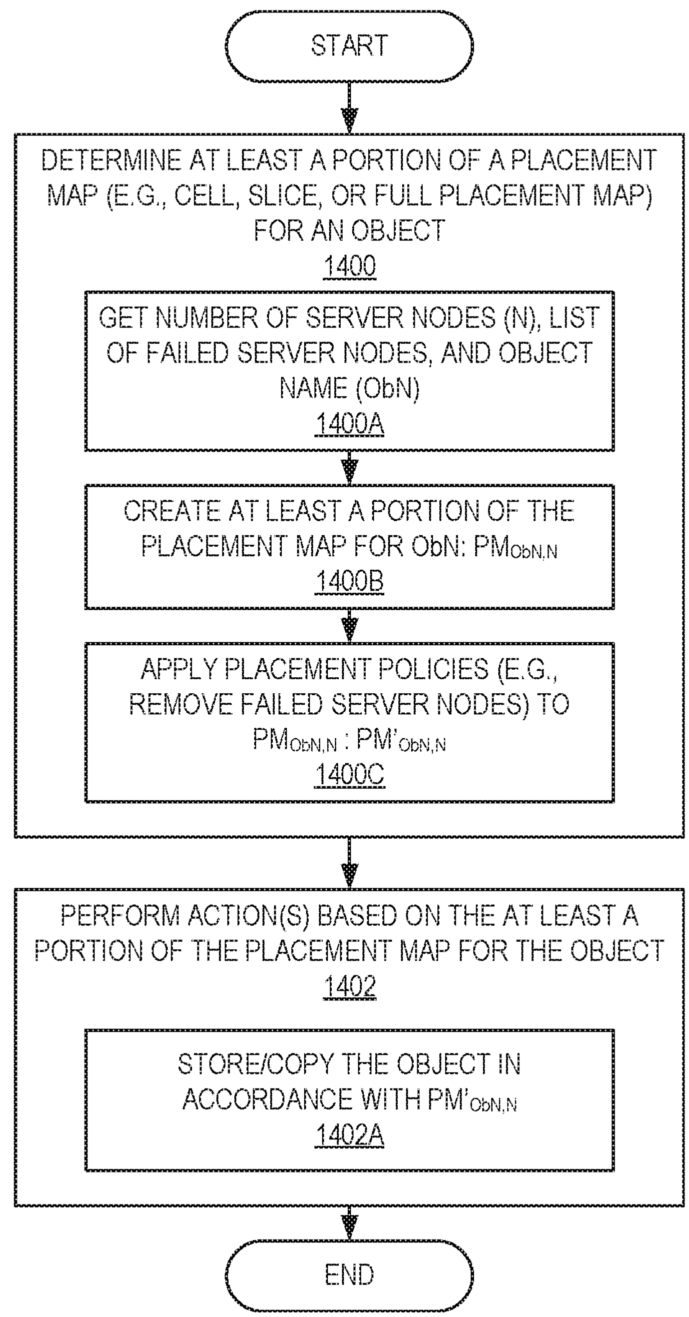
FIG. 14 is a flow chart that illustrates the operation of a server node in accordance with some embodiments of the present disclosure.

While much of the discussion above has focused on the generation and use of the placement map for the object at the client node 108, the placement map is also generated and used by the server nodes 102. In this regard, FIG. 14 is a flow chart that illustrates the operation of a server node 102 in accordance with some embodiments of the present disclosure. As illustrated, the server node 102 determines at least a portion of a placement map for an object (step 1400). In general, the server node 102 generates the at least a portion of the placement map for the object in the same manner as described above. Specifically, the server node 102 gets (i.e., obtains) the number ($N_S$) of server nodes 102 in the distributed storage system 100, an object name (ObN) of the object, and in some embodiments a list of failed server nodes 102, if any (step 1400A). In some embodiments, the server node 102 receives (e.g., via frequent update) an updated map for the distributed storage system 100. This map includes information that indicates the number ($N_S$) of server nodes 102 and, in some embodiments, the status of the server nodes 102. The status of the server nodes 102 can be used by the server node 102 to obtain the list of failed server nodes 102. This map for the distributed storage system 100 is not the focus of the present disclosure and can be generated in any suitable manner.

The server node 102 creates (i.e., generates) at least a portion of the placement map ($PM_{ObN}$) for the object (step 1400B). The placement map for the object is referred to herein as $PM_{ObN}$. As an example, the server node 102 generates the portion of the placement map for the object that is relevant to the situation where the number of server nodes 102 is $N_S$, where this portion is referred to herein as $PM_{ObN,Ns}$. After creating the at least a portion of the placement map for the object, the server node 102 applies one or more policies to the at least a portion of the placement map $PM_{ObN}$ for the object to generate at least a portion of a modified placement map $PM'_{ObN}$ for the object, as described above (step 1400C). Lastly, the server node 102 performs one or more actions for the object in accordance with the modified placement map $PM'_{ObN}$ (step 1402). For example, the server node 102 stores/copies one or more replicas of the object on one or more other server nodes 102 in accordance with the modified placement map $PM'_{ObN}$ (step 1402A).

The data mapping procedure described herein is a deterministic but random-across-object data mapping procedure that determines the hosting server node 102 of each replica of an object for each possible value of $N_S$ with the goal to reduce the overhead related to the addition, removal, or failure of a server node(s) 102, among other changes to the cluster. The data mapping procedure can be executed by the stakeholders (object owner, cluster administrator, etc.) independently, and therefore a great performance can be achieved via parallel and independent operation of these stakeholders.

Figure 15:
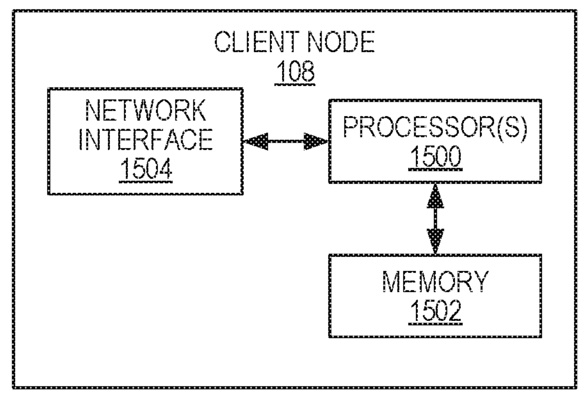
FIGS. 15 and 16 illustrate example embodiments of a client node.

FIG. 15 is a schematic block diagram of the client node 108 according to some embodiments of the present disclosure. As illustrated, the client node 108 includes one or more processors 1500 (e.g., Central Processing Units (CPUs), Application Specific Integrated Circuits (ASICs), Field Programmable Gate Arrays (FPGAs), and/or the like), memory 1502, and a network interface 1504. In some embodiments, the functionality of the client node 108 described above may be fully or partially implemented in software (e.g. the storage client 112) that is, e.g., stored in the memory 1502 and executed by the processor(s) 1500.

In some embodiments, a computer program including instructions which, when executed by at least one processor, causes the at least one processor to carry out the functionality of the client node 108 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 16:
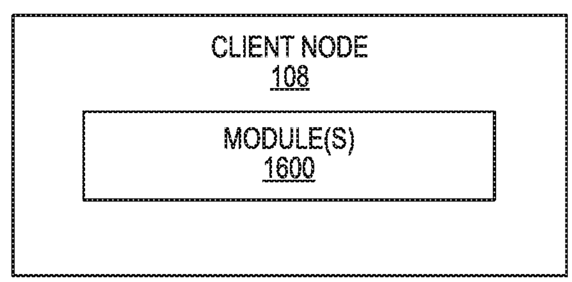

FIG. 16 is a schematic block diagram of the client node 108 according to some other embodiments of the present disclosure. The client node 108 includes one or more modules 1600, each of which is implemented in software. The module(s) 1600 provide the functionality of the client node 108 described herein. For example, the modules 1600 may include a determining module operable to determine a server node 102 for a read/write operation for an object based on at least a portion of a placement map or modified placement map for the object as described above with respect to, e.g., step 200 of FIGS. 2 and 3 and a performing module operable to perform a read/write operation for the object from/to the determined server node 102 as described above with respect to, e.g., step 202 of FIGS. 2 and 3.

Figure 17:
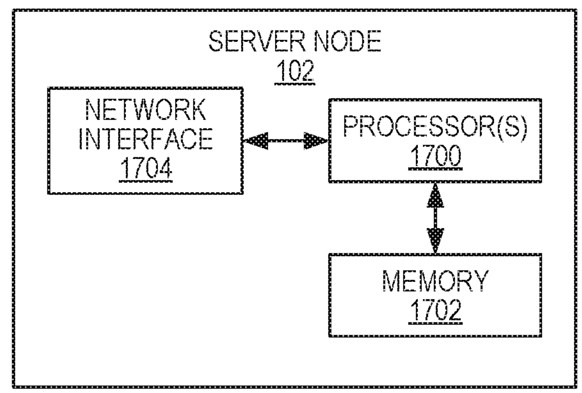
FIGS. 17 and 18 illustrate example embodiments of a server node.

FIG. 17 is a schematic block diagram of the server node 102 according to some embodiments of the present disclosure. As illustrated, the server node 102 includes one or more processors 1700 (e.g., CPUs, ASICs, FPGAs, and/or the like), memory 1702, and a network interface 1704. In some embodiments, the functionality of the server node 102 described above may be fully or partially implemented in software (e.g., the storage server 104) that is, e.g., stored in the memory 1702 and executed by the processor(s) 1700.

In some embodiments, a computer program including instructions which, when executed by at least one processor, causes the at least one processor to carry out the functionality of the server node 102 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 18:
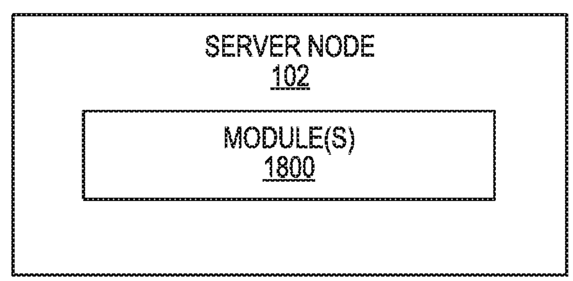

FIG. 18 is a schematic block diagram of the server node 102 according to some other embodiments of the present disclosure. The server node 102 includes one or more modules 1800, each of which is implemented in software. The module(s) 1800 provide the functionality of the server node 102 described herein. For example, the modules 1800 may include a determining module operable to determine at least a portion of a placement map or modified placement map for an object as described above with respect to, e.g., step 1400 of FIG. 14 and a performing module operable to perform one or more actions based on the at least a portion of the placement map or modified placement map for the object as described above with respect to, e.g., step 1402 of FIG. 14.

At least some of the following abbreviations may be used in this disclosure. If there is an inconsistency between abbreviations, preference should be given to how it is used above. If listed multiple times below, the first listing should be preferred over any subsequent listing(s).

2D Two-Dimensional

3D Three-Dimensional

ASIC Application Specific Integrated Circuit

CPU Central Processing Unit

DCSS Distributed Cloud Storage System

FPGA Field Programmable Gate Array

MD Message Digest

SDS Software Defined Storage

SHA-256 256 bit Secure Hash Algorithm

Those skilled in the art will recognize improvements and modifications to the embodiments of the present disclosure. All such improvements and modifications are considered within the scope of the concepts disclosed herein.

What is claimed is:

1. A method for a client node to perform a read/write operation in a distributed storage system, comprising:

obtaining a number of server nodes in a plurality of server nodes comprised in the distributed storage system and an object name of an object for which a read/write operation is to be performed;

creating at least a portion of a three-dimensional placement map for the object as a function of the number of server nodes and the object name, wherein the three-dimensional placement map defines a plurality of candidate locations for a plurality of replicas of the object on the plurality of server nodes comprised in the distributed storage system, wherein the at least a portion of the three-dimensional placement map for the object is a portion of the three-dimensional placement map that defines the plurality of candidate locations for the plurality of replicas of the object for only one of a plurality of possible values for the number of server nodes that is equal to the obtained number of server nodes;

applying one or more policies to the at least a portion of the three-dimensional placement map to provide at least a portion of a modified three-dimensional placement map for the object; and performing the read/write operation for the object in accordance with the at least a portion of the modified three-dimensional placement map for the object.

2. The method of claim 1, wherein performing the read/write operation for the object in accordance with the at least a portion of the modified three-dimensional placement map for the object comprises performing the read/write operation for the object from/to one of the plurality of server nodes defined by the at least a portion of the modified three-dimensional placement map as a first candidate location for one of the plurality of replicas of the object when the plurality of server nodes consists of the obtained number of server nodes.

3. The method of claim 1, wherein the at least a portion of the three-dimensional placement map for the object is a portion of the three-dimensional placement map that defines the plurality of candidate locations for only one of the plurality of replicas of the object for only one of a plurality of possible values for the number of server nodes that is equal to the obtained number of server nodes.

4. The method of claim 1, wherein the at least a portion of the three-dimensional placement map for the object is the three-dimensional placement map that defines the plurality of candidate locations for all of the plurality of replicas of the object for all of a plurality of possible values for the number of server nodes.

5. The method of claim 1, wherein creating the at least a portion of the three-dimensional placement map comprises:

generating a set of reproducible random values as a function of the object name, the set of reproducible random values comprising, for each of at least one possible value for the number of server nodes in the distributed storage system, a plurality of reproducible random values for each of the plurality of replicas of the object, respectively, where the at least one possible value for the number of server nodes comprises the obtained number of server nodes and no two random values in the set of reproducible random values are the same; and converting the set of reproducible random values into the at least a portion of the three-dimensional placement map for the object.

6. The method of claim 5, wherein converting the set of reproducible random values into the at least a portion of the three-dimensional placement map for the object comprises, for a random value ($h_{i,j,k}$) from the set of reproducible random values that corresponds to a k-th candidate location for an i-th replica of the object for a j-th possible value for the number of server nodes:

determining whether mod($h_{i,j,k}$, j) is equal to zero; and upon determining that mod($h_{i,j,k}$, j) is equal to zero, setting a value ($C_{i,j,k}$) in the three-dimensional placement map for the object for the k-th candidate location for the i-th replica of the object for the j-th possible value for the number of server nodes equal to a value that indexes a j-th server node from among the plurality of server nodes in the distributed storage system; and upon determining that mod($h_{i,j,k}$, j) is not equal to zero, setting the value ($C_{i,j,k}$) in the three-dimensional placement map for the object for the k-th candidate location for the i-th replica of the object for the j-th possible value for the number of server nodes equal to a value ($C_{i,j-1,k}$) in the three-dimensional placement map for the object for the k-th candidate location for the i-th replica of the object for a (j−1)-th possible value for the number of server nodes.

7. The method of claim 5, wherein:

converting the set of reproducible random values into the at least a portion of the three-dimensional placement map for the object comprises, for each random value ($h_{i,j,k}$) from a plurality of random values ($h_{i,j,k}$ for k=1, . . . , D) wherein D is a positive integer or an i-th replica of the object for a j-th possible value for the number of server nodes:

determining whether mod($h_{i,j,k}$, j) is equal to zero; and upon determining that mod($h_{i,j,k}$, j) is equal to zero, setting a value ($C_{i,j,k}$) in the three-dimensional placement map for the object for the k-th candidate location for the i-th replica of the object for the j-th possible value for the number of server nodes equal to a value that indexes a j-th server node from among the plurality of server nodes in the distributed storage system; and upon determining that mod($h_{i,j,k}$, j) is not equal to zero, setting the value ($C_{i,j,k}$) in the three-dimensional placement map for the object for the k-th candidate location for the i-th replica of the object for the j-th possible value for the number of server nodes equal to a value ($C_{i,j-1,k}$) in the three-dimensional placement map for the object for the k-th candidate for the i-th replica of the object for a (j−1)-th possible value for the number of server nodes; and applying the one or more policies comprises:

removing one or more of the plurality of candidate locations in the at least a portion of the three-dimensional placement map for the i-th replica of the object for the j-th possible value for the number of server nodes in accordance with the one or more policies; and shifting a plurality of remaining candidate locations in the three-dimensional placement map for the i-th replica of the object for the j-th possible value for the number of server nodes to replace the removed candidate locations.

8. The method of claim 7, wherein the value ($C_{i,j,1}$) in the modified three-dimensional placement map for a first candidate location of the plurality of remaining candidate locations for the i-th replica of the object for the j-th possible value for the number of server nodes indicates one of the plurality of server nodes on which the i-th replica of the object is located if the number of server nodes is equal to the j-th possible value for the number of server nodes.

9. The method of claim 1, wherein the one or more policies comprise a policy to remove one or more failed server nodes in a list of failed server nodes obtained by the client node.

10. The method of claim 1, wherein the one or more policies comprise a policy to weight the plurality of server nodes in accordance with one or more capabilities of the plurality of server nodes such that the plurality of server nodes are included in the three-dimensional placement map in accordance with their respective weightings.

11. The method of claim 1, wherein the one or more policies comprise a topology-based policy.

12. A client node for performing a read/write operation in a distributed storage system, the client node comprising:

a network interface;

at least one processor; and memory comprising instructions executable by the at least one processor whereby the client node is operable to:

obtain a number of server nodes in a plurality of server nodes comprised in the distributed storage system and an object name of an object for which a read/write operation is to be performed;

create at least a portion of a three-dimensional placement map for the object as a function of the number of server nodes and the object name, wherein the three-dimensional placement map defines a plurality of candidate locations for a plurality of replicas of the object on the plurality of server nodes comprised in the distributed storage system, wherein the at least a portion of the three-dimensional placement map for the object is a portion of the three-dimensional placement map that defines the plurality of candidate locations for the plurality of replicas of the object for only one of a plurality of possible values for the number of server nodes that is equal to the obtained number of server nodes;

apply one or more policies to the at least a portion of the three-dimensional placement map to provide at least a portion of a modified three-dimensional placement map for the object; and perform the read/write operation for the object in accordance with the at least a portion of the modified three-dimensional placement map for the object.

13. A method for a server node comprising circuitry in a distributed storage system, comprising:

obtaining a number of server nodes in a plurality of server nodes comprised in the distributed storage system and an object name of an object;

creating at least a portion of a three-dimensional placement map for the object as a function of the number of server nodes and the object name, wherein the three-dimensional placement map defines a plurality of candidate locations for a plurality of replicas of the object on the plurality of server nodes comprised in the distributed storage system, wherein the at least a portion of the three-dimensional placement map for the object is a portion of the three-dimensional placement map that defines the plurality of candidate locations for the plurality of replicas of the object for only one of the plurality of possible values for the number of server nodes that is equal to the obtained number of server nodes;

applying one or more policies to the at least a portion of the three-dimensional placement map to provide at least a portion of a modified three-dimensional placement map for the object; and performing one or more actions based on the at least a portion of the modified three-dimensional placement map for the object.

14. The method of claim 13, wherein performing the one or more actions comprises storing one or more of the plurality of replicas of the object at the locations defined by the at least a portion of the modified three-dimensional placement map.

15. The method of claim 13, wherein creating the at least a portion of the three-dimensional placement map comprises:

generating a set of reproducible random values as a function of the object name, the set of reproducible random values comprising, for each of at least one of the plurality of possible values for the number of server nodes in the distributed storage system, a plurality of reproducible random values for each of the plurality of replicas of the object, respectively, where the at least one of the plurality of possible values for the number of server nodes comprises the obtained number of server nodes and no two random values in the set of reproducible random values are the same; and converting the set of reproducible random values into the at least a portion of the three-dimensional placement map for the object.

16. The method of claim 15, wherein converting the set of reproducible random values into the at least a portion of the three-dimensional placement map for the object comprises, for a random value ($h_{i,j,k}$) from the set of reproducible random values ($h_{i,j,k}$ for k=1, . . . , D, wherein D is a positive integer) that corresponds to a k-th candidate location for an i-th replica of the object for a j-th possible value for the number of server nodes:

determining whether mod($h_{i,j,k}$, j) is equal to zero; and upon determining that mod($h_{i,j,k}$, j) is equal to zero, setting a value ($C_{i,j,k}$) in the three-dimensional placement map for the object for the k-th candidate location for the i-th replica of the object for the j-th possible value for the number of server nodes equal to a value that indexes a j-th server node from among the plurality of server nodes in the distributed storage system; and upon determining that mod($h_{i,j,k}$, j) is not equal to zero, setting the value ($C_{i,j,k}$) in the three-dimensional placement map for the object for the k-th candidate location for the i-th replica of the object for the j-th possible value for the number of server nodes equal to a value ($C_{i,j-1,k}$) in the three-dimensional placement map for the object for the k-th candidate location for the i-th replica of the object for a (j−1)-th possible value for the number of server nodes.

17. The method of claim 13, wherein the one or more policies comprise a policy to remove one or more failed server nodes in a list of failed server nodes obtained by the client node.

18. The method of claim 13, wherein the one or more policies comprise a topology-based policy.

* * * * *